United States Patent
Gupta et al.

(10) Patent No.: US 11,029,701 B2
(45) Date of Patent: Jun. 8, 2021

(54) APPARATUS AND METHOD FOR NAVIGATION CONTROL

(71) Applicant: GREY ORANGE PTE. LTD., Singapore (SG)

(72) Inventors: Akash Gupta, Delhi (IN); Wolfgang Kurt Hoeltgen, Laatzen (DE); Samay Kohli, New Delhi (IN); Gaurav Kejriwal, Benares (IN); Srijan Choudhary, Bilaspur (IN); Tushar Agrawal, Gurgaon (IN); Swarnik, Jamshedpur (IN)

(73) Assignee: GREY ORANGE PTE. LTD., Singapore (SG)

( * ) Notice: Subject to any disclaimer, the term of this patent is extended or adjusted under 35 U.S.C. 154(b) by 0 days.

(21) Appl. No.: 15/549,329

(22) PCT Filed: Feb. 3, 2016

(86) PCT No.: PCT/IB2016/000079
§ 371 (c)(1),
(2) Date: Aug. 7, 2017

(87) PCT Pub. No.: WO2016/124999
PCT Pub. Date: Aug. 11, 2016

(65) Prior Publication Data
US 2018/0275680 A1    Sep. 27, 2018

(30) Foreign Application Priority Data

Feb. 5, 2015  (AU) ............................... 2015-900362
Feb. 5, 2015  (SG) ........................... 10201500882V

(51) Int. Cl.
G06F 7/00     (2006.01)
G05D 1/00     (2006.01)
(Continued)

(52) U.S. Cl.
CPC .......... *G05D 1/0274* (2013.01); *B66F 9/063* (2013.01); *G01C 21/206* (2013.01);
(Continued)

(58) Field of Classification Search
None
See application file for complete search history.

(56) References Cited

U.S. PATENT DOCUMENTS 5,280,431 A      1/1994  Summerville et al.
6,240,342 B1 *   5/2001  Fiegert ................. B25J 9/1666
                                                         180/169
(Continued)

FOREIGN PATENT DOCUMENTS

EP    0 367 527 A2    5/1990
EP    0 367 527 A3    5/1990
(Continued)

OTHER PUBLICATIONS

Extended European Search Report dated Jul. 18, 2018 in Patent Application No. 16746175.5 9 pages.
(Continued)

*Primary Examiner* — Adam D Tissot
(74) *Attorney, Agent, or Firm* — Oblon, McClelland, Maier & Neustadt, L.L.P.

(57) ABSTRACT

Described herein are an apparatus and a method for controlling movement of a vehicle along a transportation path. The method includes receiving, by circuitry of an information processing apparatus, first marker information that is generated based on a first marker being detected by the vehicle, wherein the first marker being one of a plurality of markers located at predetermined positions. The circuitry further determines a second marker of the plurality of markers to which the vehicle is to be moved from the first marker and thereafter generates first control information to
(Continued)

control movement of the vehicle from the first marker to the second marker based on the first marker information and pre-determined navigation information associated with the first marker, wherein the predetermined navigation information indicates the location of the second marker relative to the first marker. The circuitry further transmits the first control system station information to the vehicle.

18 Claims, 14 Drawing Sheets

(51) Int. Cl.
| | |
|---|---|
| G05D 1/02 | (2020.01) |
| G05B 19/418 | (2006.01) |
| G06Q 10/08 | (2012.01) |
| B66F 9/06 | (2006.01) |
| G06Q 10/06 | (2012.01) |
| G06Q 10/04 | (2012.01) |
| G06Q 50/28 | (2012.01) |
| G01C 21/20 | (2006.01) |
| B66F 9/075 | (2006.01) |
| G06K 19/06 | (2006.01) |
| B65G 43/00 | (2006.01) |
| G06K 19/07 | (2006.01) |
| G01G 19/08 | (2006.01) |

(52) U.S. Cl.
CPC ..... *G05B 19/41895* (2013.01); *G05D 1/0223* (2013.01); *G05D 1/0234* (2013.01); *G05D 1/0236* (2013.01); *G05D 1/0261* (2013.01); *G05D 1/0291* (2013.01); *G05D 1/0297* (2013.01); *G06Q 10/04* (2013.01); *G06Q 10/0631* (2013.01); *G06Q 10/087* (2013.01); *G06Q 10/0833* (2013.01); *G06Q 50/28* (2013.01); *B65G 43/00* (2013.01); *B66F 9/0755* (2013.01); *G01G 19/08* (2013.01); *G05B 2219/50393* (2013.01); *G05D 1/0272* (2013.01); *G05D 2201/0216* (2013.01); *G06K 19/06* (2013.01); *G06K 19/06028* (2013.01); *G06K 19/06037* (2013.01); *G06K 19/0723* (2013.01)

(56) References Cited

U.S. PATENT DOCUMENTS

| | | | |
|---|---|---|---|
| 7,591,630 | B2 | 9/2009 | Lert, Jr. |
| 7,991,505 | B2 | 8/2011 | Lert, Jr. et al. |
| 8,425,173 | B2 | 4/2013 | Lert et al. |
| 8,594,835 | B2 | 11/2013 | Lert et al. |
| 8,740,538 | B2 | 6/2014 | Lert et al. |
| 8,784,034 | B2 | 7/2014 | Lert, Jr. |
| 9,051,120 | B2 | 6/2015 | Lert et al. |
| 9,096,375 | B2 | 8/2015 | Lert et al. |
| 9,317,037 | B2 | 4/2016 | Byford et al. |
| 2009/0043440 | A1 | 2/2009 | Matsukawa et al. |
| 2010/0076591 | A1 | 3/2010 | Lert, Jr. |
| 2010/0322746 | A1 | 12/2010 | Lert et al. |
| 2013/0096735 | A1 | 4/2013 | Byford et al. |
| 2013/0302132 | A1 | 11/2013 | D'Andrea |
| 2014/0058556 | A1* | 2/2014 | Kawano ............... G05D 1/0234 700/216 |
| 2014/0214195 | A1 | 7/2014 | Worsley |
| 2014/0271063 | A1 | 9/2014 | Lert et al. |
| 2015/0032252 | A1 | 1/2015 | Galluzzo et al. |
| 2015/0071743 | A1 | 3/2015 | Lert, Jr. |
| 2015/0266672 | A1 | 9/2015 | Lert et al. |
| 2015/0332213 | A1 | 11/2015 | Galluzzo et al. |

FOREIGN PATENT DOCUMENTS

| | | |
|---|---|---|
| KR | 10-2013-0084597 A | 7/2013 |
| WO | WO 2016/124999 A1 | 8/2016 |
| WO | WO 2016/125000 A1 | 8/2016 |
| WO | WO 2016/125001 A1 | 8/2016 |

OTHER PUBLICATIONS

International Search Report and Written Opinion of the International Searching Authority dated Jun. 23, 2016 in PCT/IB2016/000079 filed Feb. 3, 2016.
Chilean Office Action dated Feb. 13, 2019 in Chilean Patent Application No. 201702005, 7 pages.
Communication pursuant to Article 94(3) EPC dated Apr. 25, 2019 in corresponding EP Application No. 16 746 175.5-1204 (8 pages).
Japanese Office Action dated Jan. 28, 2020 in Patent Application No. 2017-559927 (with English translation), 8 pages.
Office Action dated Aug. 20, 2019, in Chilean Patent Application No. 201702005 (with English-language translation).
European Communication Pursuant to Article 94(3) EPC dated Nov. 15, 2019 in Patent Application No. 16 746 175.5.
First Office Action dated Mar. 20, 2020 in corresponding Chinese Patent Application No. 201680019536.5 (with English translation (36 pages).
Preliminary Office Action dated May 13, 2020 in corresponding Brazilian Patent Application No. BR112017016933-9 (with English translation)(5 pages).

\* cited by examiner

APPARATUS AND METHOD FOR NAVIGATION CONTROL

CROSS-REFERENCE TO RELATED APPLICATIONS

The present application claims priority to Singapore Patent Application No. 10201500882V and Australian Patent Application No. 2015900362, both filed Feb. 5, 2015, and incorporated herein by reference in their entirety.

FIELD

The present disclosure relates generally to controlling movement of a vehicle and a goods handling system wherein goods are stored in, and retrieved, from a goods storage area.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In a partially automated goods handling system, goods are stored in a goods storage area and transported between the goods storage area and operator stations using transportation vehicles, such as transportation robots. In such a system, the transportation vehicles are navigated through the goods storage area using machine detectable tape that is disposed on the floor of a warehouse along predefined movement paths, or by using lasers that interact with reflective material that is disposed, for example, on walls of the warehouse.

However, such existing goods handling systems require relatively complex transportation vehicles and involve computationally intensive tasks to control the positions of the vehicles. Furthermore, such systems do not control the positions of the transportation vehicles with high precision. Accordingly, there is a requirement for a technique that accurately controls (and monitors) the positions of the transportation vehicles in a seamless and computationally efficient manner.

SUMMARY

An aspect of the present disclosure provides for a method for controlling movement of a vehicle along a transportation path, the method comprising: receiving, by circuitry of an information processing apparatus, first marker information that is generated based on a first marker being detected by the vehicle, the first marker being one of a plurality of markers located at predetermined positions; determining, by the circuitry, a second marker of the plurality of markers to which the vehicle is to be moved from the first marker; generating first control information to control movement of the vehicle from the first marker to the second marker based on the first marker information and predetermined navigation information associated with the first marker, the predetermined navigation information indicating the location of the second marker relative to the first marker; and transmitting the first control information to the vehicle.

By one embodiment, the method further comprises: receiving, by the circuitry, second marker information that is generated based on the second marker being detected by the vehicle; determining, by the circuitry, a third marker of the plurality of markers to which the vehicle is to be moved from the second marker; and generating second control information to control movement of the vehicle from the second marker to the third marker based on the second marker information and the predetermined navigation information, the predetermined navigation information indicating the location of the third marker relative to the second marker.

By one embodiment, the second marker neighbors the first marker, and the predetermined navigation information indicates the relative location of each marker of the plurality of markers that neighbors the first marker. Furthermore, each of the plurality of markers is a machine readable pattern, wherein the machine readable pattern includes one of a barcode and a quick response (QR) code. Additionally, each of the plurality of markers includes a radio-frequency identification (RFID) device.

By one embodiment, the first marker information includes a unique identifier extracted by the vehicle from the machine readable pattern.

By one embodiment, the method further comprises: receiving, by the circuitry, rack marker information that is generated based on a rack marker being detected by the vehicle, the rack marker being disposed on a rack that is to be transported by the vehicle.

The first marker information includes orientation information of the vehicle with respect to the first marker and identification information associated with the first marker, wherein the first marker information includes an image of the first marker that is captured by the vehicle.

By an embodiment, the method further comprises computing, by the circuitry, the transportation path, the transportation path including a sequence of markers of the plurality of markers to be traversed by the vehicle starting at a source marker and terminating at a destination marker, wherein the transportation path is computed using an A* algorithm.

Additionally, the transportation path is divided into a plurality of path segments, and the method further comprises: transmitting control information to control the movement of the vehicle at a start of each of the path segments.

By one embodiment, the method further comprises retrieving the predetermined navigation information from a marker map stored in a memory, the marker map including, for each of the plurality of markers, navigation information indicative of the location of at least one defined other marker of the plurality of markers relative to the respective one of the plurality of markers, the navigation information being usable to control movement of the vehicle between the respective one of the plurality of markers and the at least one defined other marker, wherein the navigation information includes a displacement value corresponding to a distance between the respective one of the plurality of markers and the at least one defined other marker of the plurality of markers, and a bearing angle value.

By one embodiment, the marker map includes a plurality of keys, each key of the plurality of keys corresponding to one of the plurality markers and including: a first data field that stores identification information when a vehicle is disposed on the corresponding marker, a second data field that stores reservation information of the corresponding marker, a third data field that stores information corresponding to neighboring markers of the corresponding marker, the neighboring markers including at least one of a marker that is deployed in a north direction, a south direction, an east direction, and a west direction from the corresponding marker, the information being used to determine validity of the vehicle travelling from the corresponding marker to the corresponding neighboring marker, a fourth data field that stores a distance of the corresponding marker to each of the neighboring markers, the distance being used to determine a cost incurred by the vehicle in travelling from the corresponding marker to the corresponding neighboring marker, and a fifth data field that indicates whether the vehicle can deploy a goods rack at the corresponding marker.

By one aspect of the present disclosure is provided an information processing apparatus for controlling movement of a vehicle along a transportation path, the information processing apparatus comprising circuitry configured to: receive first marker information that is generated based on a first marker being detected by the vehicle, the first marker being one of a plurality of markers located at predetermined positions, determine a second marker of the plurality of markers to which the vehicle is to be moved from the first marker, generate first control information to control movement of the vehicle from the first marker to the second marker based on the first marker information and predetermined navigation information associated with the first marker, the predetermined navigation information indicating the location of the second marker relative to the first marker, and transmit the first control information to the vehicle.

By one embodiment, the circuitry is further configured to receive second marker information that is generated based on the second marker being detected by the vehicle; determine a third marker of the plurality of markers to which the vehicle is to be moved from the second marker; and generate second control information to control movement of the vehicle from the second marker to the third marker based on the second marker information and the predetermined navigation information, the predetermined navigation information indicating the location of the third marker relative to the second marker, wherein the second marker neighbors the first marker, and the predetermined navigation information indicates the relative location of each marker of the plurality of markers that neighbors the first marker.

Further, by one embodiment, each of the plurality of markers is a machine readable pattern, wherein the machine readable pattern includes one of a barcode and a quick response (QR) code, and wherein each of the plurality of markers includes radio-frequency identification (RFID) device.

By one embodiment, the first marker information includes a unique identifier extracted by the vehicle from the machine readable pattern, and wherein the circuitry is further configured to: receive rack marker information that is generated based on a rack marker being detected by the vehicle, the rack marker being disposed on a rack that is to be transported by the vehicle.

By one embodiment, for the information processing apparatus, the first marker information includes orientation information of the vehicle with respect to the first marker and identification information associated with the first marker, wherein the first marker information includes an image of the first marker that is captured by the vehicle.

By an embodiment, the circuitry is further configured to: compute the transportation path, the transportation path including a sequence of markers of the plurality of markers to be traversed by the vehicle starting at a source marker and terminating at a destination marker, wherein the transportation path is computed using an A* algorithm.

By one embodiment, the transportation path is divided into a plurality of path segments, and the circuitry is further configured to transmit control information to control the movement of the vehicle at a start of each of the path segments, and retrieve the predetermined navigation information from a marker map stored in a memory, the marker map including, for each of the plurality of markers, navigation information indicative of the location of at least one defined other marker of the plurality of markers relative to the respective one of the plurality of markers, the navigation information being usable to control movement of the vehicle between the respective one of the plurality of markers and the at least one defined other marker.

By one embodiment, the navigation information includes a displacement value corresponding to a distance between the respective one of the plurality of markers and the at least one defined other marker of the plurality of markers, and a bearing angle value, wherein the marker map includes a plurality of keys, each key of the plurality of keys corresponding to one of the plurality of markers and including: a first data field that stores identification information when a vehicle is disposed on the corresponding marker, a second data field that stores reservation information of the corresponding marker, a third data field that stores information corresponding to neighboring markers of the corresponding marker, the neighboring markers including at least one of a marker that is deployed in a north direction, a south direction, an east direction, and a west direction from the marker, the information being used to determine validity of the vehicle travelling from the corresponding marker to the corresponding neighboring marker, a fourth data field that stores a distance of the corresponding marker to each of the neighboring markers, the distance being used to determine a cost incurred by the vehicle in travelling from the corresponding marker to the corresponding neighboring marker, and a fifth data field that indicates whether the vehicle can deploy a goods rack at the marker.

An aspect of the present disclosure provides a non-transitory computer readable medium having stored thereon a program that when executed by a computer, causes the computer to execute a method for controlling movement of a vehicle along a transportation path, the method comprising: receiving first marker information that is generated based on a first marker being detected by the vehicle, the first marker being one of a plurality of markers located at predetermined positions; determining a second marker of the plurality of markers to which the vehicle is to be moved from the first marker; generating first control information to control movement of the vehicle from the first marker to the second marker based on the first marker information and predetermined navigation information associated with the first marker, the predetermined navigation information indicating the location of the second marker relative to the first marker; and transmitting the first control information to the vehicle.

By one embodiment, the method further comprises: receiving second marker information that is generated based on the second marker being detected by the vehicle; determining a third marker of the plurality of markers to which the vehicle is to be moved from the second marker; and generating second control information to control movement of the vehicle from the second marker to the third marker based on the second marker information and the predetermined navigation information, the predetermined navigation information indicating the location of the third marker relative to the second marker.

By one embodiment, the second marker neighbors the first marker, and the predetermined navigation information indicates the relative location of each marker of the plurality of markers that neighbors the first marker, wherein each of the plurality of markers is a machine readable pattern, and wherein the machine readable pattern includes one of a barcode and a quick response (QR) code.

By one embodiment, the first marker information includes a unique identifier extracted by the vehicle from the machine readable pattern, and the method further comprises receiving rack marker information that is generated based on a rack marker being detected by the vehicle, the rack marker being disposed on a rack that is to be transported by the vehicle, wherein the first marker information includes orientation information of the vehicle with respect to the first marker and identification information associated with the first marker.

By one embodiment, the first marker information includes an image of the first marker that is captured by the vehicle, and the method further comprises computing the transportation path, the transportation path including a sequence of markers of the plurality of markers to be traversed by the vehicle starting at a source marker and terminating at a destination marker, wherein the transportation path is computed using an A* algorithm.

Additionally, by one embodiment, the transportation path is divided into a plurality of path segments, and the method further comprises: transmitting control information to control the movement of the vehicle at a start of each of the path segments, and retrieving the predetermined navigation information from a marker map stored in a memory, the marker map including, for each of the plurality of markers, navigation information indicative of the location of at least one defined other marker of the plurality of markers relative to the respective one of the plurality of markers, the navigation information being usable to control movement of the vehicle between the respective one of the plurality of markers and the at least one defined other marker.

By one embodiment, the navigation information includes a displacement value corresponding to a distance between the respective one of the plurality of markers and the at least one defined other marker of the plurality of markers, and a bearing angle value.

By one embodiment, the marker map includes a plurality of keys, each key of the plurality of keys corresponding to one of the plurality of markers and including: a first data field that stores identification information when a vehicle is disposed on the corresponding marker, a second data field that stores reservation information of the corresponding marker, a third data field that stores information corresponding to neighboring markers of the corresponding marker, the neighboring markers including at least one of a marker that is deployed in a north direction, a south direction, an east direction, and a west direction from the corresponding marker, the information being used to determine validity of a vehicle travelling from the corresponding marker to the corresponding neighboring marker, a fourth data field that stores a distance of the corresponding marker to each of the neighboring markers, the distance being used to determine a cost incurred by the vehicle in travelling from the corresponding marker to the corresponding neighboring marker, and a fifth data field that indicates whether the vehicle can deploy a goods rack at the marker.

By one aspect of the present disclosure is provided detecting, by circuitry of the vehicle, a first marker of a plurality of markers located at predetermined positions; generating, by the circuitry, first marker information based on the detected first marker; transmitting, by the circuitry, the generated first marker information to an information processing apparatus; receiving, by the circuitry, first control information from the information processing apparatus, the first control information being generated by the information processing apparatus based on the first marker information and predetermined navigation information in response to the first marker information; and causing, by the circuitry, the vehicle to move to a second marker of the plurality of markers based on the first control information, wherein the predetermined navigation information indicates the location of the second marker relative to the first marker.

By one embodiment, the method further includes detecting, by the circuitry, the second marker; generating, by the circuitry, second marker information based on the detected second marker; transmitting, by the circuitry, the generated second marker information to the information processing apparatus; receiving, by the circuitry, second control information from the information processing apparatus, the second control information being generated by the information processing apparatus based on the second marker information and the predetermined navigation information in response to the first marker information; and causing, by the circuitry, the vehicle to move to the third marker of the plurality of markers, wherein the predetermined navigation information indicates the location of the third marker relative to the second marker, sand wherein the second marker neighbors the first marker, and the predetermined navigation information indicates the relative location of each marker of the plurality of markers that neighbors the first marker. Furthermore, each of the plurality of markers is a machine readable pattern, wherein the machine readable pattern includes a bar code or quick response (QR) code and wherein each of the plurality of markers includes an radio-frequency identification (RFID) device.

By one embodiment, the step of generating the first marker information comprises: extracting, by the circuitry, a unique identifier from the machine readable pattern, wherein the first marker information includes orientation information of the vehicle with respect to the first marker and identification information associated with the first marker, and the first marker information includes an image of the first marker that is captured by the vehicle.

According to one embodiment, the transportation path is divided into a plurality of path segments, and the method further comprises: receiving control information to control the movement of the vehicle at a start of each of the path segments.

An aspect of the present disclosure provides for a vehicle comprising circuitry configured to: detect a first marker of a plurality of markers located at predetermined positions, generate first marker information based on the detected first marker, transmit the generated first marker information to an information processing apparatus, receive first control information from the information processing apparatus, the first control information being generated by the information processing apparatus based on the first marker information and predetermined navigation information in response to the first marker information, and cause the vehicle to move to a second marker of the plurality of markers based on the first control information, wherein the predetermined navigation information indicates the location of the second marker relative to the first marker.

By one embodiment, the circuitry is further configured to: detect the second marker; generate second marker information based on the detected second marker; transmit the generated second marker information to the information processing apparatus; receive second control information from the information processing apparatus, the second control information being generated by the information processing apparatus based on the second marker information and the predetermined navigation information in response to the first marker information; and cause the vehicle to move to the third marker of the plurality of markers, wherein the predetermined navigation information indicates the location of the third marker relative to the second marker.

By one embodiment, the second marker neighbors the first marker, and the predetermined navigation information indicates the relative location of each marker of the plurality of markers that neighbors the first marker. Furthermore, each of the plurality of markers is a machine readable pattern, wherein the machine readable pattern includes a bar code or quick response (QR) code, and wherein each of the plurality of markers includes an radio-frequency identification (RFID) device.

By one embodiment, the circuitry is further configured to: extract a unique identifier from the machine readable pattern, and wherein the first marker information includes orientation information of the vehicle with respect to the first marker and identification information associated with the first marker.

By one embodiment, the first marker information includes an image of the first marker that is captured by the vehicle and wherein the transportation path is divided into a plurality of path segments, and the circuitry is further configured to: receive control information to control the movement of the vehicle at a start of each of the path segments.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of the present disclosure that are provided as examples will be described in detail with reference to the following figures, wherein like numerals reference like elements, and wherein.

DETAILED DESCRIPTION

Figure 1:
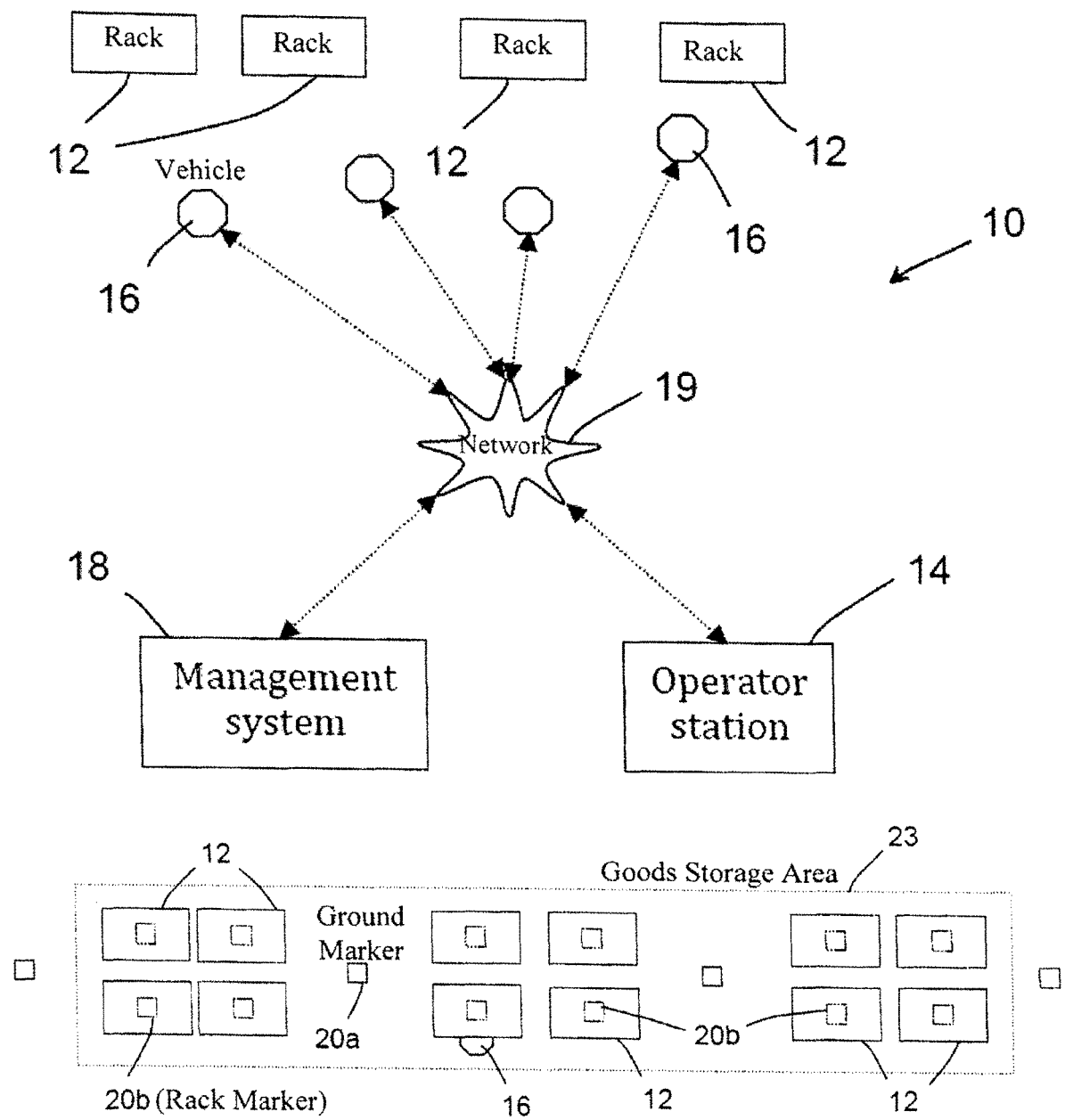
FIG. 1 is a block diagram of a goods handling system in accordance with an embodiment.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Turning now to FIG. 1 is illustrated a goods handling system 10. The system 10 includes a plurality of goods racks 12, each of which is configured to hold several goods items that may be included in an order, such as a customer order. Goods handling system 10 also includes one or more operator stations 14 and a plurality of vehicles 16 that transport goods racks 12 between a goods storage area 23 and one or more operator stations 14. In an example, the vehicles can be transportation vehicles or transportation robots.

Movement of the transportation vehicles 16 is managed by a management system 18, in communication with the operator station(s) 14 and the transportation vehicles 16, through a communication network 19, such as a wireless communication network and the like. By one embodiment, the management system 18 comprises an information processing apparatus such as a server (described later with reference to FIG. 8) that includes circuitry configured to control the navigational, monitoring, and other tasks described herein. In operation, items required to fulfil an order are transported between the goods storage area 23 and the operator station 14 by at least one transportation vehicle 16. Orders are fulfilled in part, by transporting racks 12 including items of the order. The goods handling system also includes markers 20a and 20b that are disposed, for instance, on the floor of a warehouse, and that enable navigating the vehicle 16 from one point to another. The inbound inventory process and outbound order fulfillment process are managed in this example by the management system 18.

Figure 2:
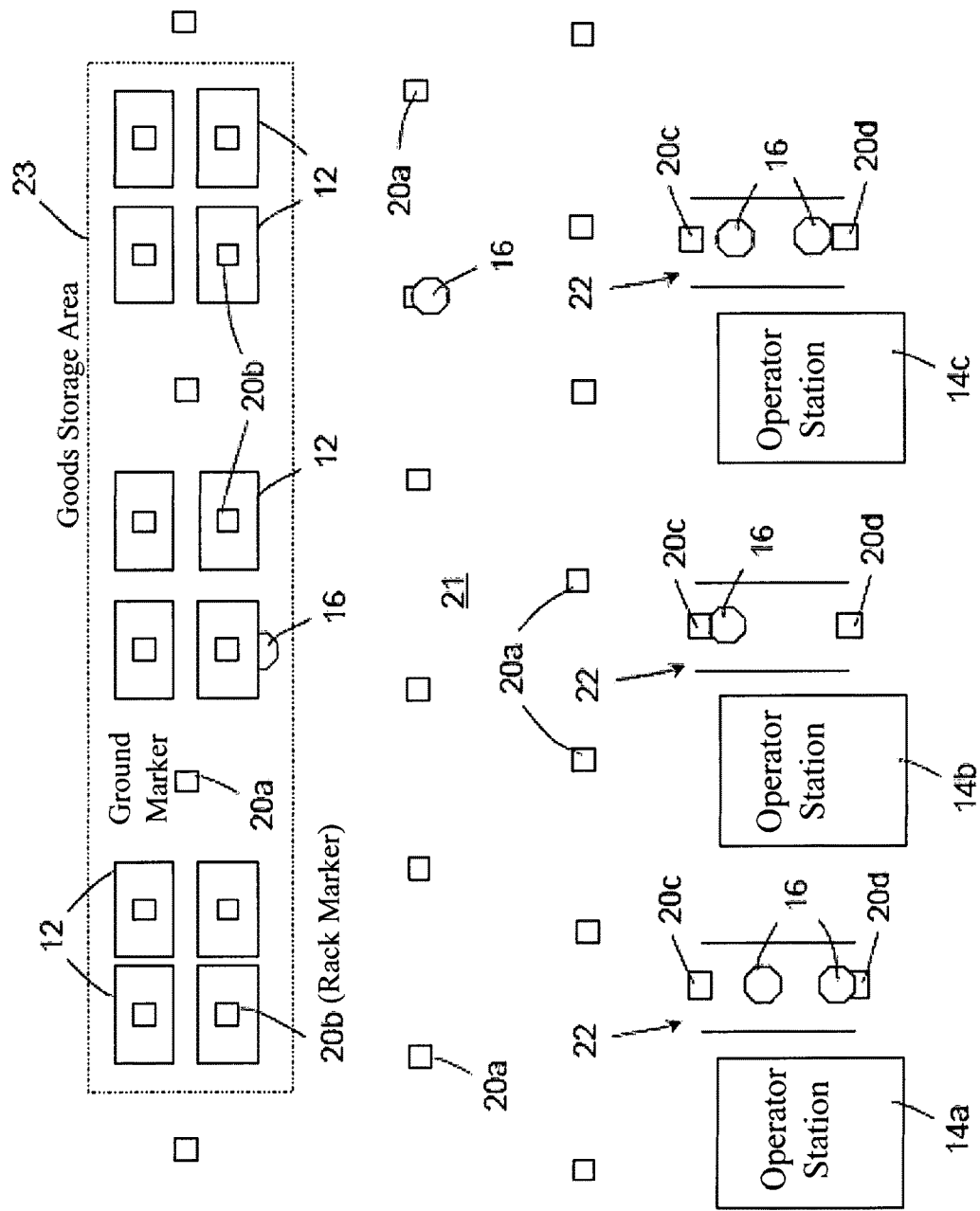
FIG. 2 is a diagrammatic representation of a warehouse in which the goods handling system of FIG. 1 is implemented.

FIG. 2 illustrates an exemplary warehouse in which the goods handling system 10 of FIG. 1 can be implemented. The warehouse includes a plurality of markers 20a-20d disposed on a floor 21 of the warehouse. FIG. 2 illustrates multiple markers 20a-20d, which are classified by one embodiment, according to the type and/or location of markers within the warehouse. However, only some of the markers (20a-20d) have been labeled so as not to clutter the illustration. Reference to a particular marker 20a, 20b, 20c, or 20d could refer to any of the particular labeled markers.

The racks 12 are stored in a goods storage area 23. In this example, the markers can be categorized as warehouse markers 20a disposed generally between the goods storage area 23 and the operator station(s) 14a-14c. Rack markers 20b are associated with and disposed under a rack 12 when the associated rack 12 is disposed at a defined storage location in the goods storage area 23. Queue entry markers 20c are disposed at entry locations of station queues 22, and queue exit markers 20d are disposed at exit locations of station queues 22. It will be understood, however, that markers may in addition, or alternatively, be disposed elsewhere, such as on the walls.

By one embodiment, the markers 20a-20d are in the form of a machine readable barcode. However, any machine readable markers that are capable of being individually identified such as an RFID tag, QR codes and the like may be incorporated by embodiments described herein. Each marker 20a-20d has associated unique identification information that is linked to navigational information. The identification information can be used to control movement of a vehicle between one of a first marker 20a-20d and at least one other of markers 20a-20d. For each marker 20a-20d, the navigational information defines the direction and distance between the first marker 20a-20d and every other marker 20a-20d that has been associated with the first marker 20a-20d. In some embodiments, other markers 20a-20d correspond to possible obstacles or areas of interest from the first designated marker 20a-20d. The other markers 20a-20d can be adjacent to the first marker 20a-20d or within a pre-determined distance.

From the navigational information, navigation paths can be defined between multiple markers 20a-20d by identifying each marker 20a-20d, as a vehicle 16 passes over or adjacent to the marker 20a-20d. By one embodiment, sensors, such as one or more cameras can be located on a bottom surface of vehicle 16. As vehicle 16 drives across a marker 20a-20d, the sensor identifies the particular marker 20a-20d, and thereby identifies a location of vehicle 16.

According to one embodiment, a server controls the navigation operations of the vehicles 16 in the warehouse. Specifically, as a vehicle 16 traverses over a particular marker, the vehicle 16 captures an image of the marker and transmits the captured image to the server. The server upon receiving the marker image, processes the marker image, to determine the unique information identification associated with the marker. Additionally or alternatively, by one embodiment, the vehicle 16 upon capturing the image of the marker may process the image to determine the unique identification information and thereafter transmits the identification information to the server.

The server processes the received marker image and/or the unique identification information associated with the marker, to transmit navigational information that is stored in a map database (also referred to herein as a marker map and described later with reference to FIG. 7) to the vehicle 16. By one embodiment, the server transmits navigational information to the vehicle 16 on a hop-by-hop basis. Specifically, in order to navigate a vehicle 16 between a source marker and a destination marker, a transportation path is computed (by the server) that indicates a sequence of markers between the source marker and the destination marker that are to be traversed by the vehicle 16. Further, for the given sequence of markers that are traversed by the vehicle 16, each time the vehicle 16 captures, and thereafter transmits (to the server), the image of, or unique identification associated with, the marker at which it is currently disposed over, the server transmits to the vehicle 16, navigational information from the current marker to the next subsequent marker in the sequence of the markers.

By one embodiment, in order to navigate the vehicle 16 between the source marker and the destination marker, the server computes a transportation path that indicates a sequence of markers between the source marker and the destination marker that are to be traversed by the vehicle 16. Thereafter, the server transmits to the vehicle 16, navigational information corresponding to the traversal of a plurality of consecutive markers in the sequence of markers. For instance, the server may transmit navigation information corresponding to the traversing of five consecutive markers in the sequence of markers. In doing so, the present disclosure incurs the advantageous ability of utilizing the communication bandwidth of the goods handling system 10 in an efficient manner.

It will be appreciated that since each marker 20a-20d has navigational information associated with it that is used to instruct a vehicle 16 to move from one marker 20a-20d to an adjacent marker 20a-20d, the markers 20a-20d do not need to be disposed on the floor 21 of the warehouse in any predefined pattern. The markers 20 may be disposed on the floor 21 at locations that are appropriate for the configuration of the warehouse. In addition, the markers 20a-20d may be disposed elsewhere, for example on walls or racks.

Navigational information can also be used to prevent collisions and to prevent and resolve deadlock situations with multiple vehicles 16. In an embodiment, a vehicle 16 can reserve a portion of its navigation path before embarking on the navigation path. Portions of a navigation path are reserved since only one vehicle 16 at a time can occupy the same portion or segment of a navigation path. If the portion of the navigation path is available, the vehicle 16 makes the reservation and begins to move towards its destination point. As the vehicle 16 passes through the reserved portion of its path, the reserved portion becomes unreserved, so as not to hinder another vehicle 16 from travelling through the same reserved portion. By one embodiment, the vehicle 16 continues to reserve successive portions of its navigation path and un-reserve the travelled portions.

A moving reservation can be made to reserve a pre-determined number of path segments while a vehicle 16 is travelling on a navigation path. The number of reserved path segments may be dependent upon the particular region of the navigation path, such as turning a corner, traversing a one-way area, moving around an obstacle, or any movement that would likely encumber another nearby vehicle 16 within a section of the same navigation path.

According to one embodiment, two vehicles 16 may need to pass through the same region at the same time, such as an intersection. In this situation, a vehicle 16 can reserve a portion of its navigation path that traverses through the intersection. In addition, the vehicle 16 can place a safety reservation on the intersecting portion of the intersecting path, so that another vehicle 16 does not travel through the intersection while the first vehicle 16 is traveling through the intersection. After the first vehicle 16 has travelled through the intersection, the first vehicle 16 can release the safety reservation.

According to one embodiment, a deadlock manager can be notified when a first vehicle 16, or an obstacle is blocking a second vehicle 16 in its navigation path. The deadlock manager can create a dependency graph. When there is a cycle within the graph, i.e. a cyclic dependency, the deadlock manager can take control of the deadlock situation and move one of the vehicles 16 in the cycle out of the loop so the other vehicle 16 can proceed on its navigation path. If an obstacle is blocking a vehicle 16 from proceeding forward, the navigation path can be altered by the deadlock manager to allow passage of the vehicle 16 back onto its navigation path.

Embodiments described herein can also prevent deadlock situations from occurring. When a navigation path is calculated for a particular vehicle 16, the navigation path may be stored in a separate database. When a vehicle 16 is about to reserve a particular section or segment of a navigation path, a database query is performed to determine whether another vehicle 16 has a planned navigation path for that particular section or segment under consideration. If so, a safety reservation of each segment of the overlapping paths is made by the vehicle 16 until a section of the navigation path is reached in which there is no potential deadlock point. No other vehicles 16 can reserve a segment or section in which a safety reservation is present. In an embodiment, another vehicle 16 can enter and leave the safety zone, but it cannot stop in the safety zone. Embodiments for preventing deadlock situations consider the actual navigation path, as well as the time of travel upon the navigation path.

Figure 3:
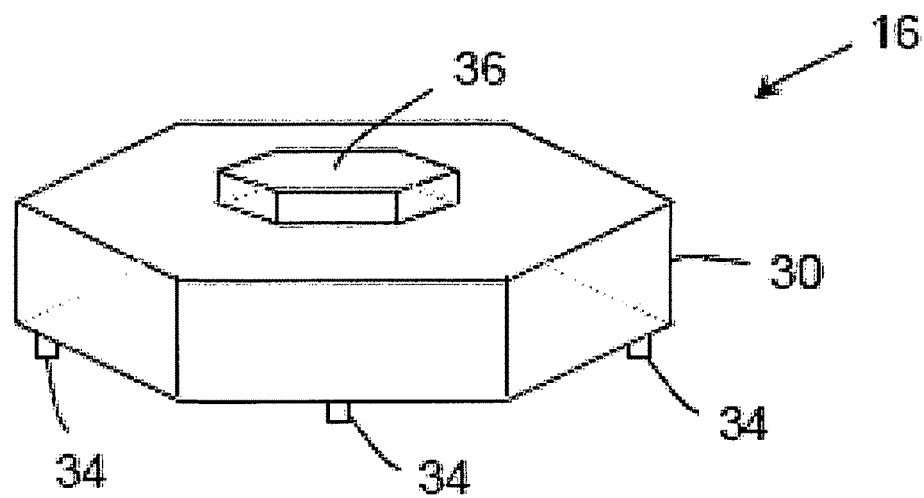
FIG. 3 is a diagrammatic representation of a transportation vehicle of the goods handling system shown in FIG. 1.

FIG. 3 depicts an exemplary transportation vehicle 16. The vehicle 16 may be a transportation vehicle or a transportation robot. The vehicle 16 includes a body 30 and wheels 34, at least some of which are individually controllable so as to control the speed and direction of movement of the vehicle 16. Various types and sizes of wheels 34 are contemplated by embodiments described herein, which may depend upon the type of floor surface. For example, smaller wheels can be used on a smooth hard floor surface, whereas larger rubber wheels may be needed on a rough floor surface. A contact plate 36 can be controllably raised or lowered relative to the body 30 in order to raise or lower a goods rack 12 disposed on the transportation vehicle 16, and thereby facilitate transport of the goods rack 12 between the goods storage area 23 and an operator station 14.

Figure 4:
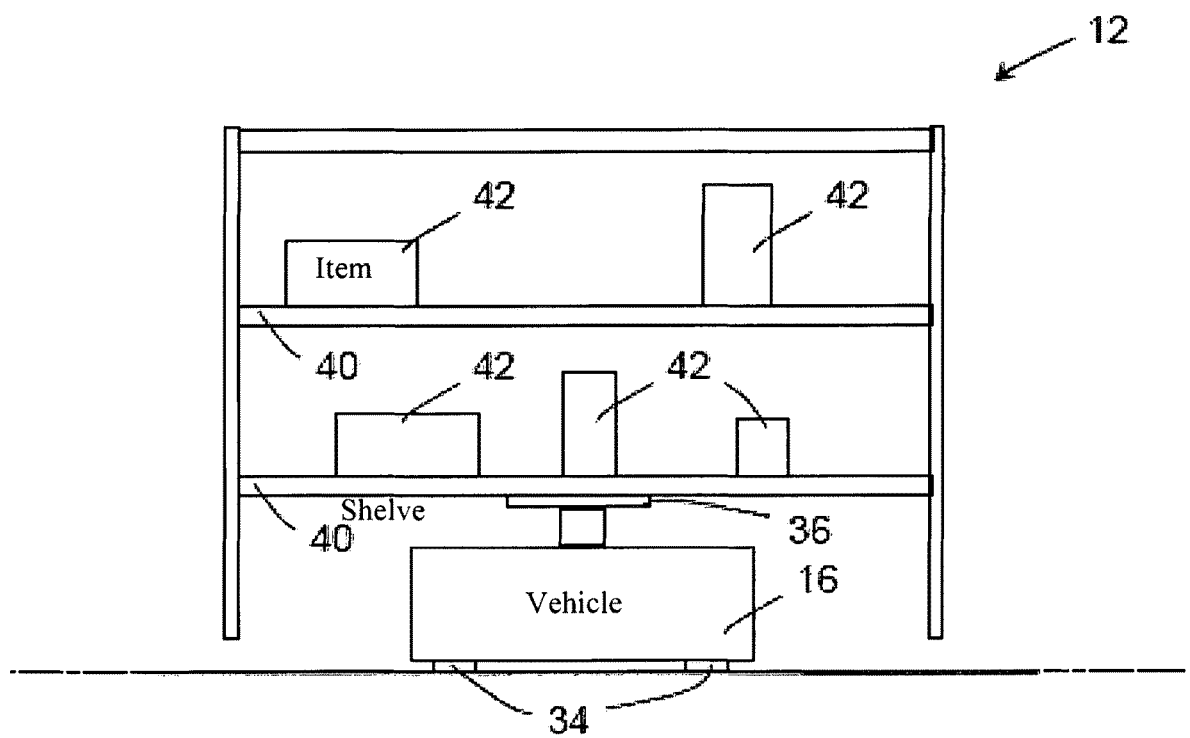
FIG. 4 is a diagrammatic representation illustrating a vehicle transporting a goods rack of the goods handling system shown in FIG. 1.

A goods rack 12 transported by a vehicle 16 is illustrated in FIG. 4. As illustrated, the contact plate 36 is disposed in a raised position and consequently raises the goods rack 12 relative to the floor 21. In an example, the goods rack 12 can be raised by the contact plate 36 of the vehicle 16 by about 5-10 cm, for example. However, other raised dimensions are contemplated by embodiments described herein, which may depend upon factors such as the type of floor, the smoothness of the floor, the levelness of the floor, and or a total weight of goods carried by the rack 12. For instance, if the weight of the goods on the rack is above a certain predetermined threshold weight, the height of the rack can be set to a predetermined height level (corresponding to the total weight) in order to ensure a low-centre of gravity of the vehicle. In doing so, the present disclosure incurs the advantageous ability of ensuring that the rack is stable and goods on the rack can be transported from one location to another without the fear of goods items toppling over. Additionally, the goods rack 12 includes one or more shelves 40, each of which incorporates several item-receiving locations that are capable of receiving goods items 42. The item-receiving locations may further be separated by compartments thereby providing ease of access to an operator who is assigned to a workstation in retrieving the goods.

Figure 5:
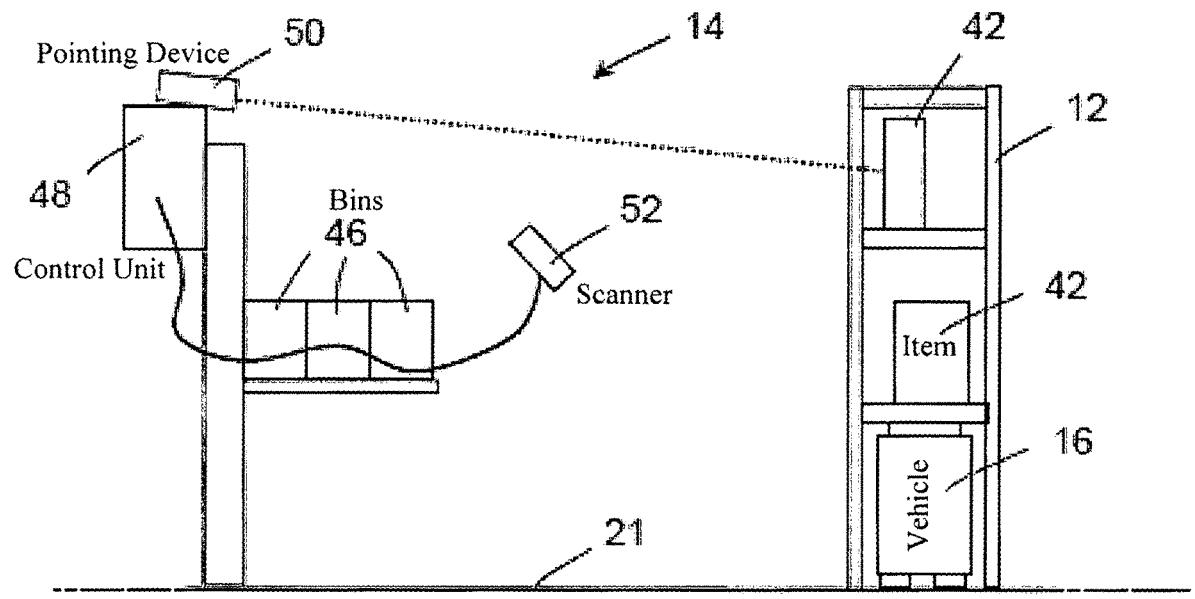
FIG. 5 is a diagrammatic representation of an operator station of the goods handling system shown in FIG. 1.

Turning now to FIG. 5 is illustrated an exemplary operator station 14. The operator station 14 can be configured as a pick and/or put station depending on whether the operator station 14 is used for one or both of adding new goods items to the goods storage area 23 and retrieving items to fulfil all or a portion of an order from the goods storage area 23.

As shown in FIG. 5, the operator station 14 includes a plurality of order bins 46, each order bin 46 being used to receive items that form part of an order. It will be understood that when retrieval of items to fill an order is automated, and disposal of the items in the order bins 46 is controlled by the system 10, the system 10 is capable of fulfilling multiple orders at the same time. Multiple orders can also be fulfilled at the same time when the pick and/or put station is able to accommodate more than one person.

The operator station 14 of FIG. 5 is illustrated during an order-fulfillment process, wherein goods items 42 that form part of an order are retrieved from the goods storage area 23 and disposed in an order bin 46 by an operator. The order bin 46 is assigned to the order by a server of the system 10. The operator station 14 includes a control unit 48 configured to control and coordinate operations in the operator station 14. The operator station 14 also includes a pointing device 50, such as a laser pointer and a scanner 52 configured to scan an identifier disposed on a goods item 42. The identifier may be any computer-readable identifier, including a line barcode or a matrix code, such as a QR code.

When goods items 42 are transported to the operator station 14 by a transportation vehicle 16, a goods item 42 that forms part of an order currently being fulfilled is identified by a pointing device 50. In this example, a laser pointer points towards the goods item 42. In one embodiment, the laser points to a code that includes, but is not limited to a barcode or a matrix code. In addition, different laser colours can be used to identify goods items 42 for multiple orders to be placed in associated multiple bins. The use of different laser colours or other distinguishing identification methods is beneficial when the same goods rack 12 includes the same or different goods items that can fulfil multiple orders.

After removing the identified goods item 42 from the rack 12, the operator at the operator station 14 may scan the barcode or matrix code on the goods item 42 using the scanner 52. In doing so, the goods item 42 may be verified by the control unit 48, thereby ensuring that the correct goods item 42 for the current order has been removed from the rack 12. The appropriate order bin 46 for the goods item 42 is then indicated to the operator, for example by illuminating a light at the order bin 46. In the case of different laser colors, the light for the order bin 46 may be configured to match the laser color used for the corresponding order.

By one embodiment, each marker 20a-20d has associated navigational information that identifies a navigation path from a first marker to one or more other markers, such as markers that are located adjacent to the first marker. In this way, a marker map is defined for all markers 20a-20d, with each marker 20a-20d having associated information that effectively defines the location of the first marker relative to other markers along one or more pre-determined paths.

Figure 6:
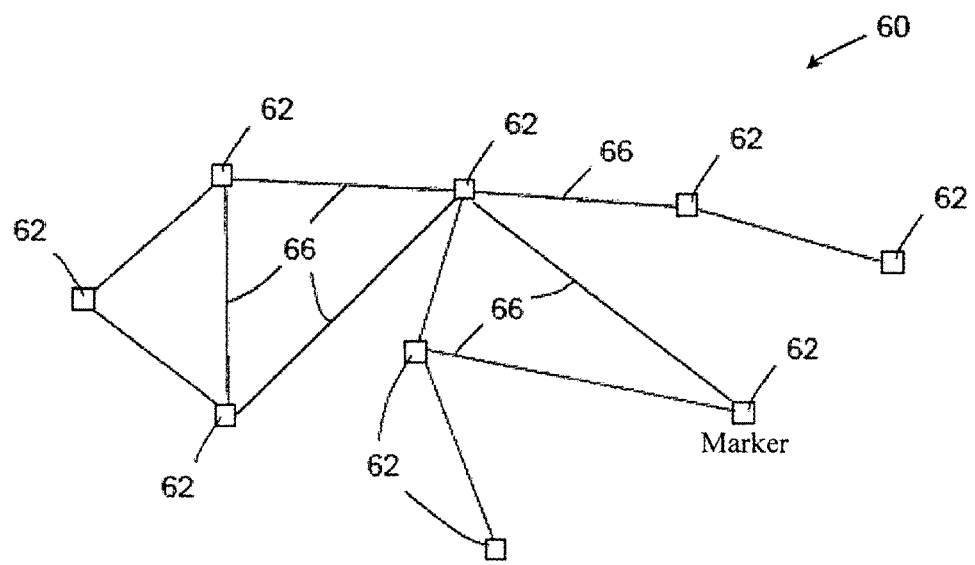
FIG. 6 is a diagrammatic representation illustrating relationships between markers of the goods handling system according to graph theory.

FIG. 6 illustrates a graph theory representation 60 of a marker map. The graph 60 includes nodes 62 (each of which represents one of the markers 20a-20d), and edges 66. Edges 66 indicate that a connection exists between two markers 20a-20d. Specifically, an edge 66 connecting two markers indicates that a vehicle 16 can directly travel from one marker to the other marker, without visiting any other intermediate marker. Thus, all the edges considered as a whole, define the position of the markers 20a-20d relative to each other.

According to one embodiment, the server may maintain data corresponding to the connectivity relationship between the different markers in a database (referred to herein as a marker-map). The data can be stored in a key-value type database, with the barcode (or unique identification information) as the key and the properties associated with the barcode as the value. The properties can be defined in such a way that certain requirements can be fulfilled, such as a listing of neighbour markers within the navigation data and the like. Accordingly, rather than storing marker positions as absolute points in space, in the present embodiment, the marker positions are stored relative to each other. In doing so, the present disclosure provides the advantageous ability of identifying, in a time efficient manner, the connectivity relationships between the markers. Accordingly, the server utilizes the marker-map to determine routes between a source marker and a destination marker.

By one embodiment, the marker map is a database system that stores all data related to detectable points on a surface, such as a floor of a warehouse. Each point represents a two-dimensional area in territory. The code from a first marker can be verified as being in the marker map. The code can be a barcode, which is one point in a map structure denoted by a unique string, which is encoded into the marker. Adjacent or nearby neighbour markers 20a-20d of the first marker can also be listed by storing the marker information of each marker relative to every other marker. In doing so, a savings in processing power and time consumed in calculating a distance to another marker is provided.

Embodiments described herein for a marker map are capable of determining whether a barcode exists in the marker map, and further listing the barcodes of all neighboring markers of the marker. For a particular barcode, the marker map lists neighbor markers, which will be affected if a rack of a particular size is rotated about a barcode. The marker map can also list the neighboring markers, wherein a particular vehicle 16 can travel to from its current barcode, depending upon the state of the vehicle 16. For each neighbor of a barcode, the marker map stores navigational information as to how to reach each neighbor marker. Navigational information may be in terms of a heading angle measured with respect to a reference point, a distance to travel, and the like. However, it must be appreciated that other navigation identifications can be used with embodiments described herein.

Additionally, the marker map may also store information pertaining to a navigation path between two markers. A navigation path and instructions from the first marker to each neighbouring marker 20a-20d may also be listed. Conditions, such as a raised lift carrying a rack 12, or a lowered lift are included in the navigation instructions to each neighbour marker 20a-20d. In addition, any neighbouring markers 20a-20d, which will be affected by the rotation of a particular sized rack 12, can be listed.

In what follows is described by one embodiment, a marker map structure that may be used with a vehicle navigation system of the present disclosure. It must be appreciated that embodiments described herein are not limited to the particular map structure. The particular map structure is represented in two-dimensional space. However, other embodiments can utilize a three-dimensional (or higher) extension of the particular map structure described herein.

Table I depicts an exemplary marker map structure illustrating information stored for markers. For the sake of illustration, only information corresponding to four markers is depicted in Table I. However, it must be appreciated that the marker map may store information corresponding to other barcodes as well. In Table I, BARCODE corresponds to the barcode number of the marker, BOTID corresponds to the the identification number of the vehicle currently disposed on the barcode, BLOCKED represents whether or not the barcode is reserved, NEIGHBOURS is a 12-bit binary field storing information pertaining to the neighbours of the marker, ZONE depicts the geographical area in the warehouse where the marker is disposed, the SIZE_INFO numbers are the distance the current barcode is away from its four (north, east, south and west) neighboring barcodes, and STORE_STATUS is binary entity depicting whether a rack can be put at the barcode (1-yes, 0-no).

According to one embodiment, the field NEIGHBOR is a twelve digit binary field wherein, three digits are reserved for each barcode that is an immediate neighbor of the barcode in the North, South, East, and West direction respectively. However, a neighbor in each of those directions is not necessarily present for each barcode. Each of the three digits (corresponding to a direction) represents the following information (expressed with reference to the North direction): (a) whether a barcode exists exist in the north direction? (1-yes, 0-no), (b) can a vehicle travel to the north barcode without a rack? (1-yes, 0-no), and (c) can the vehicle travel to the north barcode with a rack? (1-yes, 0-no).

TABLE I

Marker map structure.

| BARCODE | BOTID | BLOCKED | NEIGHBOURS | ZONE | SIZE_INFO | STORE_STATUS |
|---|---|---|---|---|---|---|
| 12.018 | Null | True | 1, 1, 1, 1, 1, 1, 1, 1, 1, 1, 1, 1 | Default | 750, 610, 750, 610 | 1 |
| 20.012 | Null | False | 1, 1, 1, 1, 1, 0, 1, 1, 1, 1, 1, 1 | Default | 610, 610, 610, 610 | 1 |
| 17.022 | Vehicle -5 | True | 1, 1, 1, 0, 1, 1, 1, 1, 1, 1, 1, 1 | Charging | 750, 610, 750, 610 | 0 |
| 17.017 | Vehicle-2 | True | 0, 1, 1, 1, 1, 1, 1, 1, 1, 1, 1, 1 | Storage | 620, 610, 610, 610 | 1 |

Figure 7:
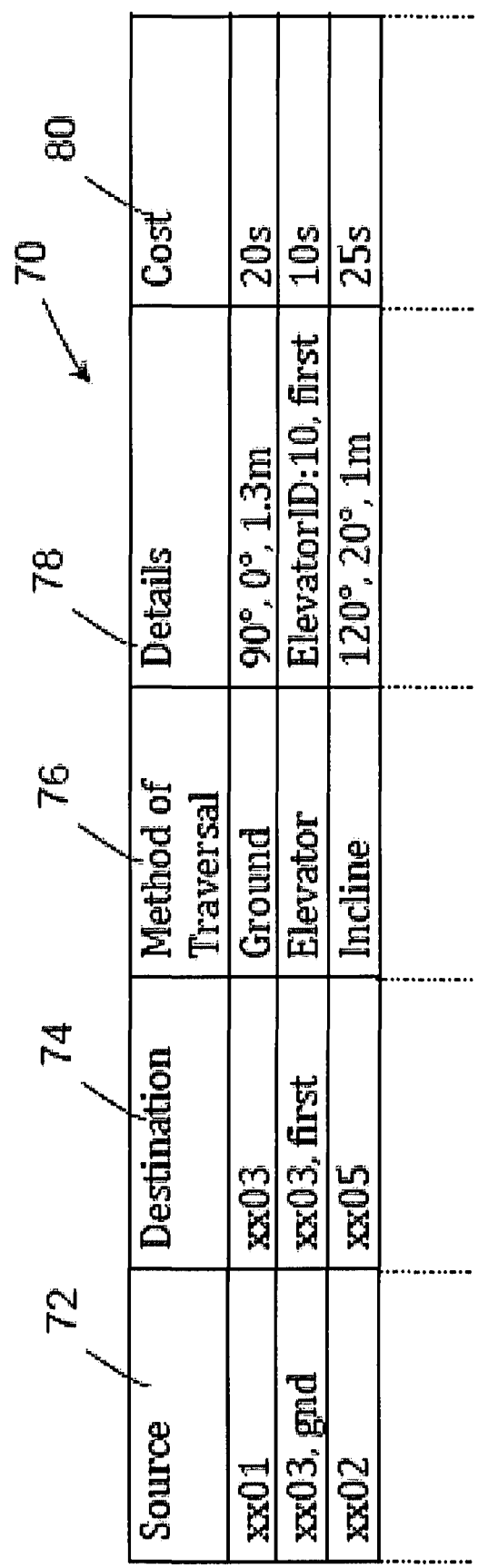
FIG. 7 illustrates an exemplary map database according to an embodiment.

FIG. 7 depicts a table 70 according to one embodiment, illustrating partial data from another exemplary marker map. The data is indicative of each marker 20a-20d relative to other markers 20a-20d. The navigational information indicative of the positions of the markers 20a-20d and their relative positions to other markers 20a-20d is stored in a database.

The table 70 includes a source field 72 including unique information identifying a source marker, a destination field 74 specifying a destination marker, and a method of traversal field 76 that indicates whether a transportation vehicle is required to travel over relatively flat ground, in an elevator, or on an incline between the source and destination markers. Table 70 also includes a details field 78 of the direction, elevation, and distance navigation values that define the navigational information required for a transportation vehicle 16 to move along a navigation path from the source marker to the destination marker. Additionally, Table 70 includes a cost field 80 that indicates the respective 'cost' of the transportation vehicle 16 moving along the navigation path in terms of the amount of time taken.

In the exemplary data illustrated in FIG. 7, the goods storage area 23 may be disposed over several levels (stories) of a building. Therefore, in order to travel between different levels of the building, the transportation vehicle 16 may be required to travel in an elevator. For this purpose, a marker may be disposed in the elevator. As illustrated in table 70, for a marker disposed in an elevator, the source and destination fields 72, 74 also include information indicative of the current floor, such as floor 21 at which the elevator is disposed. The details field 78 also includes information that uniquely identifies the elevator. In another embodiment, each floor level could be assigned one or more vehicles 16. As a result, only the rack 12 may need to travel in the elevator without the vehicle 16. The rack 12 could be loaded and unloaded by different vehicles 16, wherein a first vehicle 16 could load the rack 12 onto the elevator at the first floor level, and a second vehicle 16 could unload the rack 12 from the elevator at the second floor level.

Figure 8:
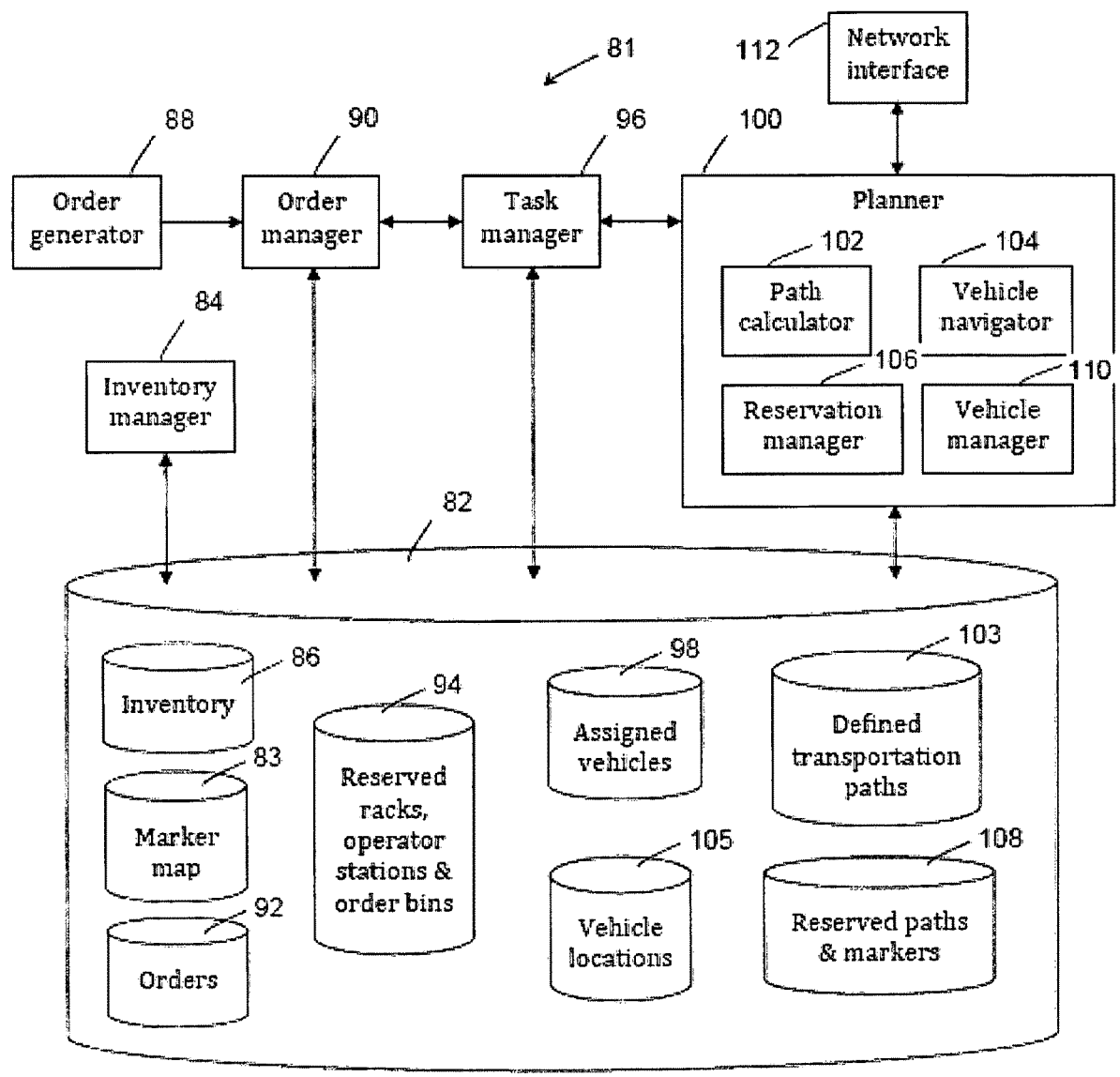
FIG. 8 is a block diagram illustrating functional components of a management system of the goods handling system shown in FIG. 1.

Turning to FIG. 8 is depicted an exemplary block diagram 81 illustrating functional components of a management system of the goods handling system. The functional components 81 are implemented by circuitry and use any suitable arrangement, for example a suitable computing device with associated processor(s), memory, and data storage (described later with reference to FIG. 16). In an embodiment, the functional components 81 include one (or more) servers working in conjunction with one or more databases. It must be appreciated that the servers described herein are not limited to any specific combination or hardware circuitry and/or software.

The functional components 81 include a data storage device 82, such as a hard disc drive (I-IDD) or a solid state device (SSD), represented in FIG. 8 as a database, although it will be understood that any suitable data storage arrangement is contemplated by embodiments described herein. The data storage device 82 is arranged to store marker data 83 indicative of a marker map of the type represented in FIGS. 6 and 7, and Table I. Marker map 83 can include the unique identifying information associated with each marker 20a-20d and the navigational relationships with other markers 20a-20d.

The functional components 81 also include an inventory manager 84 that manages the process of adding new goods items 42 to the warehouse, and records the current inventory of goods items 42 in an inventory database 86. The inventory database 86 also includes information indicative of the respective storage locations of the racks 12 in the warehouse and of the locations of the goods items 42 on the racks 12. In this way, the storage locations of all goods items 42 in the warehouse are known.

An order generator 88 manages receipt of orders from customers, such as orders received through an on-line check-out system associated with an electronic commerce website. Created orders are managed by an order manager 90 that stores details of the created orders as order entries in a pending orders database 92. The order manager 90 handles the orders posted by a client, such as posted orders through a network interface 112. The network interface 112 formats the incoming order to process them and posts them to the system 10 using one or more order application programming interfaces (APIs). The orders are posted to the pending orders list.

By one embodiment, the order manager 90 forms an order processing loop in which pending orders are to be processed, in order to find the optimum order under present conditions in which to process the pending orders. For a large volume of pending orders, filters can be used to obtain desired results. For instance, a first exemplary filter is an incoming racks filter. If any pending orders can be fulfilled by a rack that is already located at an order-processing station, those orders are placed at a higher position on the pending orders queue to increase the chances of those orders being processed, while at least one of the necessary racks 12 is still located at the order-processing station. Additionally, a second exemplary filter may be a client priority filter, or an orders priority filter in which specially-designated orders have been flagged for expedited service. A third exemplary filter may be an age filter (i.e., how long has a current order been pending the system) in which older orders are processed before newer orders.

The order manager 90 also manages the timing fulfillment of the pending orders in the orders database 92. In an example, the order manager 90 is configured to initiate the processing of a pending order when a trigger signal is generated to indicate that an order bin 46 at an operator station 14 is available to fulfil an order.

The prioritized pending orders list is forwarded to an order processing loop to get a set of goods inventory that can fulfil the order. All combinations of goods items (along with their associated rack 12 identification) and the different order-processing stations are generated to form item fulfilling combinations (IFCs), also referred to herein as an order-fulfilling list (OFL). Different rack combinations are generated for each IFC, i.e. the combination of racks containing goods items 42 for the particular order at a particular order-processing station.

The order manager 90 manages the sequence of fulfillment of pending orders by calculating a 'cost' of each pending order and initiating fulfillment of orders based on a minimum 'cost'. The order 'cost' is related to the time taken to transport all of the required racks for an order to a designated operator station 14. However, other cost factors may replace or be considered along with the time taken in other embodiments.

In an embodiment, the 'cost' can be subdivided into a distance cost, a racks cost, and a pick and/or place station (PPS) load cost. The distance cost can include the total distance to be covered by the one or more vehicles 16 between the selected racks 12 and the PPS for completion of the order. A racks cost includes the total number of racks 12 used to complete an order. Rack combinations having a fewer number of racks will minimize travel time of the one or more vehicles 16 in completing an order. A PPS load cost includes finding an optimum balance between the nearest or nearby PPSs and availability or minimal wait time at each PPS. A PPS is one example of an order-processing station. However, any station configured to organize, assemble, and/or prepare items for shipment is contemplated by embodiments described herein. An order-processing station could also be used to organize, assemble, and/or redirect items within a manufacturing environment.

For each order selected for processing, an operator station 14 is selected, one or more racks 12 that include the goods items 42 required for the order are reserved, and an order bin 46 at the operator station 14 is reserved. In order to calculate the cost of a pending order, all racks 12 that could potentially provide a goods item 42 are first identified and a rack set listing of the identified racks holding the goods item 42 is defined. A rack set listing is defined for each goods item 42. A rack combination comprising a rack 12 selected from each rack set is then selected from the determined rack sets by calculating the following heuristic for each rack combination:

$$\text{Heuristic}, H = \text{Distance}/(1 + \text{No. of Common Racks}) \quad (1)$$

where Distance is the combined distance of all racks 12 in a rack combination from an available order bin 46, and No. of Common Racks is the number of racks 12 in the rack combination that are common to more than one rack set. The heuristic H is calculated for all available order bins of the operator stations 14.

By one embodiment, the rack combination with the smallest or least heuristic H value is selected and the 'cost' associated with the selected rack combination is the time required for all racks 12 in the combination to move to the operator station 14 with the selected order bin 46. Further, the racks 12 that are included in the selected rack combination are reserved and identified in a reserved database 94. In a similar manner, the selected operator station 14 and the selected order bin 46 at the operator station 14 are also reserved by specifying the selected operator station 14 and order bin 46 in the reserved database 94.

Additionally, the functional components of block diagram 81 also include a task manager 96 that selects at least one vehicle 16 for the fulfillment of an order, when the order is selected for processing. The vehicles 16 are selected based on availability, task priority, and 'cost' of the task. The available vehicles 16 are identified and within the identified available vehicles 16, a set of vehicles are selected based on vehicles 16 currently free or in a pause state and proximity of the vehicles 16 to the racks 12 in the selected rack combination for the order. Each selected vehicle 16 is assigned a task to retrieve a particular rack 12 from the goods storage area 23. The vehicle(s) 16 selected for the order are stored in an assigned vehicles database 98.

The functional components of the block diagram 81 also include a planner 100 that controls and coordinates the planning and reservation of navigation paths for the selected vehicles 16 within a vehicle map structure. The planner 100 also plans for implementation of the movements of the vehicles 16 to and from the selected operator station 14, including control over vehicle start/stop actions and vehicle pausing/unpausing actions. The planner 100 also manages charging of the vehicles 16, including checking the charge state of the vehicles 16 and movement of the vehicles 16 requiring charging to a vehicle charging station. The planner 100 plans the execution of an assigned task, which includes but is not limited to, waiting for the vehicle 16 to achieve a ready state, changing the reservation status and updating the status of the task, checking the charge level of the vehicles 16, and assigning tasks to be charged. Managing the flow of vehicles 16 into and out of a charging station is also controlled by the planner 100.

The planner 100 includes a path calculator 102 that calculates transportation paths for each of the vehicles 16 in the set of vehicles selected for fulfillment of an order. Each transportation path defines a sequence of markers 20a-20d that a vehicle 16 will follow in order to transport a rack 12 to a rack storage location in the goods storage area 23 and between the rack storage location and the operator station 14. Calculated transportation paths for each vehicle 16 are stored in a defined paths database 103. By one embodiment, the 'cost' of each defined transportation path is based on the time taken to travel from an initial source to a final destination. The calculation of a navigation path may further depend upon the lift state of the rack 12. For instance, by one embodiment, if the lift state is up, then all other racks 12 are considered as obstacles along with the physical obstacles that may lie in the path. However, if the lift state is down, only the physical obstacles need to be considered.

According to one embodiment, the transportation paths for the vehicles 16 are computed using an A* algorithm. The algorithm uses the relationship between the markers 20a-20d, which can be defined according to graph theory as illustrated in FIG. 6, to calculate an efficient path through the markers 20a-20d from a source marker to a destination marker. An A* algorithm uses a best-first search and finds a least-cost path from a given initial node to one goal node chosen from one or more possible goals. As A* traverses a graph, it builds up a tree of partial paths. The leaves of the tree (referred to as an open set or the fringe) are stored in a priority queue that orders the leaf nodes by a cost function. It combines a heuristic estimate of the cost to reach a goal and the distance traveled from the initial node.

The cost function can be represented by $f(n)=g(n)+h(n)$, wherein $g(n)$ is the known cost of getting from the initial node to n, and this value is tracked by the algorithm. The parameter $h(n)$ is a heuristic estimate of the cost to get from n to any goal node. For the algorithm to find the actual shortest path, the heuristic function must be admissible, meaning that it should not over estimate the actual cost to get to the nearest goal node. The heuristic function is problem-specific and is provided by the user of the algorithm.

The planner 100 also includes a vehicle navigator 104 that manages movements of each vehicle 16 individually according to the respective transportation paths defined for the vehicles 16. The vehicle navigator 104 is responsible for controlling movement of a vehicle 16 along the sequence of markers 20a-20d in the transportation path, and handling communications received from the vehicles 16.

As a vehicle 16 arrives at a marker 20a-20d, the marker 20a-20d is detected by the vehicle 16 and marker information, such as unique identification information associated with the detected marker 20a-20d and/or a captured image of the marker, is communicated to the vehicle navigator 104 through the wireless communication network 19. Based on the received information, the vehicle navigator 104 verifies that the identified marker 20a-20d corresponds to the expected marker 20a-20d in the transportation path, and communicates navigational information to the vehicle 16 in order to direct the vehicle 16 to a subsequent marker 20a-20d in the transportation path. In an example, the navigational information is in the form of a bearing value and a distance value derived from the navigational information stored in the marker database 83 and illustrated in tabular form in FIG. 7. That is, the vehicle navigator 104 sends navigational information to the vehicle 16 for each separate marker 20a-20d (i.e., in a hop-by-hop basis, as stated previously).

The vehicle navigator 104 also calculates the position of a centroid of the vehicle 16 relative to a marker 20a-20d, and the orientation of the vehicle 16 relative to the marker 20a-20d. The position can be calculated using an image captured by a sensor and/or camera, such as the sensor/camera 134 illustrated in FIG. 9. The offset position of the vehicle 16 relative to a detected marker 20a-20d can be calculated there from with reference to FIG. 14. The current positions of the vehicles 16 are stored in a vehicle location database 105. As a result, the planner 100 is aware of the locations of all vehicles 16 at all times.

In addition to navigating vehicles 16 along their paths, the vehicle navigator 104 also receives and processes messages from the vehicles 16. By one embodiment, a first type of message received from a vehicle 16 is an initiate message. An initiate message is transmitted to the vehicle navigator 104 when a vehicle 16 starts up or reboots. The initiate message may be transmitted as a data packet that includes information corresponding to a scanned marker. If the scanned marker is a valid, the initiate message is processed by the vehicle manager 110, which thereafter transmits navigational directions to the vehicle.

A second type of message received by the vehicle navigator 104 from a vehicle 16 is a warning message. A warning data packet is received by the vehicle navigator 104 when a vehicle 16 reaches a valid navigation marker which is not reserved for the vehicle 16. In this situation, the navigation marker at which the vehicle 16 is located can be reserved and if possible, the next navigation marker in the navigation path is also reserved. However, if the current navigation marker is reserved by another vehicle 16, the first vehicle 16 is stopped from travelling any further.

A third type of message received by the vehicle navigator 104 from a vehicle 16 is an information message. An information data packet is sent to the vehicle navigator 104 to update a position of a rack 12 if the vehicle 16 has lifted or is carrying a rack 12. The vehicle navigator 104 informs pertinent personnel of a movement of the rack 12 and informs the vehicle manager 110 to check for any related tasks to be completed. An information packet can also un-reserve an old position if it exists and un-reserve turn reservations when they are completed. The vehicle navigator 104 updates vehicle 16 information in a relevant vehicle database, such as assigned vehicles database 98, vehicle location database 105, defined transportation paths database 103, or reserved paths and markers database 108. The vehicle navigator 104 can also determine if the destination navigation marker has been reached or if the next reservation navigation marker has been reached.

A fourth type of message received by the vehicle navigator 104 from a vehicle 16 is an error message. An error message is received by the vehicle navigator 104 when the barcode from an invalid navigation marker is read by the vehicle 16. Error packets can also be sent to the vehicle navigator 104 when an instruction to the vehicle 16 cannot be processed by the vehicle 16.

The vehicle navigator 104 can also be configured to manage movements of the vehicles 16 so that collisions are avoided. In one embodiment, collision management is achieved by managing the path and marker reservations, such that each navigation path between two markers (referred to herein as a segment) is reserved shortly before the vehicle 16 arrives. However, movement in a subsequent navigation path (i.e., a segment of the navigation path) is not allowed until the navigation path is reserved. If the navigation path is already reserved by another vehicle 16, then the vehicle 16 wishing to reserve the navigation path enters a wait state. However, in certain embodiments, a previous reservation may be canceled, and rescheduled, based on priority information, for example when a particular order is assigned a higher priority than the order being fulfilled using the existing reservation. By one embodiment, specific paths in a particular section of the warehouse may be cleared for repair or support.

Further, it must be appreciated that since the end-to-end transportation path (i.e., from the source marker to the destination marker) for each vehicle 16 is not reserved at one time instant, there may be a deadlock situation, as two vehicles 16 may wish to move in opposite directions along similar paths. In order to resolve deadlocks, one of the vehicles 16 needs to move out of the way. Accordingly, the vehicle navigator 104 can be configured to actively control one of the vehicles 16 involved in the deadlock situation to move away from the designated path, thereby allowing the other vehicle 16 in the deadlock situation to move according to its designated transportation path.

By one embodiment, the vehicle navigator 104 can be configured to actively prevent deadlock situations from occurring. When the vehicle navigator 104 attempts to reserve a marker 20a-20d for a vehicle 16, the vehicle navigator 104 checks whether another vehicle 16 also has a transportation path defined that passes through the marker 20a-20d. If so, the vehicle navigator 104 reserves markers 20a-20d for the vehicle 16 as safety reservations. For markers 20a-20d reserved as safety reservations, another vehicle 16 cannot reserve a marker 20a-20d in the safety reservations unless a marker 20a-20d is also reserved that enables the other vehicle 16 to exit the safety reserved marker 20a-20d. In other words, after a safety reservation has been made, no other vehicle 16 will be allowed to remain in the safety reserved region. Furthermore, collisions and deadlocks can be prevented by managing movements of the vehicles 16 based upon the reserved markers 20a-20d and navigation paths, and by controlling the timing of movements of the vehicles 16. As a result, collisions can be avoided by causing a vehicle 16 to wait, or by actively modifying the speed of movement of the vehicle 16.

By an embodiment of the present disclosure, navigation variables can be used by the vehicle navigator 104 in processing a navigation path. A first variable referred to herein as a segment length variable corresponds to a length of the navigation path that is to be reserved for a vehicle 16. A second variable referred to herein as reservation distance variable corresponds to the distance to the end of a navigation path. After a navigation path has been determined, a first segment length in the navigation path is reserved. The next segment, as well as the navigation marker at which the next reservation will be made is calculated. When the vehicle 16 reaches the next reservation position, another reservation distance is calculated. The above process continues until the vehicle 16 reaches its destination of the navigation path.

Furthermore, if there is a turn in a navigation path, a reservation distance is calculated for neighboring navigation markers. If a moving vehicle 16 or a turning vehicle 16 is found in a navigation path segment to be reserved, no reservation is made and a fail position is calculated. Additionally, by one embodiment, if an idle vehicle is disposed at the destination, the calculations cannot be completed. The vehicle 16 is either set to idle or it enters a wait state. By one embodiment, if an idle vehicle 16 is found in the segment to be reserved, a new path is calculated.

The planner 100 also includes a reservation manager 106 that manages reservations of markers 20a-20d and navigation paths between markers 20a-20d to avoid collisions between vehicles 16. The planner 100 stores information indicative of the reserved markers 20a-20d and navigation paths in a reserved paths and markers database 108.

The planner 100 also includes a vehicle manager 110 that controls the vehicle's start and stop operations and control the movement of the contact plate 36 of the vehicle 16 between raised and lowered positions. The vehicle manager 110 also manages the charge level of the vehicles 16, including checking the charge state of the vehicles 16 and managing movement of the vehicles 16 requiring charging to a vehicle charging station. Additionally, as shown in FIG. 8, the functional components of the block diagram 81 of the management system 18 may also include a network interface 112 that facilitates networked communications between the management system 18, the vehicles 16, and the operator stations 14.

Figure 9:
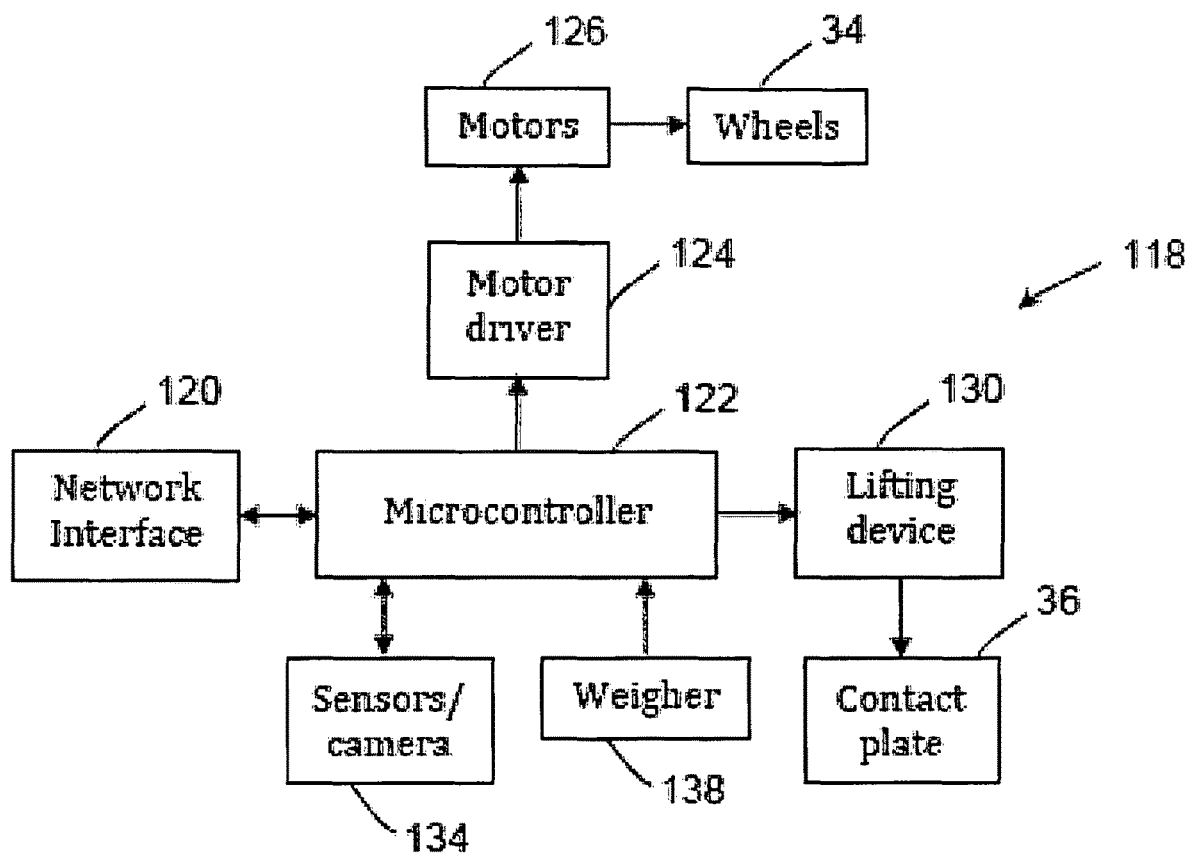
FIG. 9 is a block diagram illustrating functional components of a vehicle of the goods handling system shown in FIG. 1.

Functional components 118 of a vehicle 16, such as a transportation vehicle or transportation robot are illustrated in FIG. 9. The functional components 118 include a network interface 120 that facilitates networked communications between the vehicle 16 and each of the management system 18 and the operator stations 14. A microcontroller 122 (implemented with circuitry, and described later with reference to FIG. 16) controls and coordinates operations in the vehicle 16, and performs dedicated tasks such as managing detection of markers 20a-20d, managing control of vehicle movement according to instructions received from the vehicle navigator 104, and applying a compensation path, such as a recalculated navigation path using a Bezier curve, to the determined transportation path between markers 20a-20d. The microcontroller 122 communicates with a motor driver 124 to control one or more motors 126 associated with the vehicle wheels 34, and thereby control the speed and direction of the vehicle 16.

The functional components 118 also include a lifting device 130 that controllably raises or lowers a contact plate 36 in response to instructions from the microcontroller 122. Instructions from the microcontroller 122 can be generated in response to instructions received from the vehicle manager 110.

The functional components 118 also include at least one sensor 134, such as a camera or RFID reader, arranged to detect a marker 20a-20d when the vehicle 16 travels close to the marker 20a-20d. The sensor/camera 134 can obtain unique identification information that is associated with the marker 20a-20d. The obtained unique identification information is communicated to the planner 100 by the microcontroller 122 so that the current location of the vehicle 16 can be determined.

The sensor(s)/camera 134 can also be used to determine an offset between a location of the vehicle 16 and a location of a detected marker 20a-20d. The offset can be used to modify the transportation path defined between the detected marker 20a-20d and a subsequent marker 20a-20d in the transportation path (described later with reference to FIG. 14). This is achieved by capturing an image, including the marker 20a-20d and forwarding the image to the planner 100 for processing. In one embodiment, the offset is calculated by the vehicle 16. Since the location and orientation of the captured image relative to the vehicle 16 is known, it is possible to determine the location and orientation of the marker 20a-20d relative of the vehicle 16.

The functional components 118 also include a weigher 138 that produces a weight measurement when the vehicle 16 is transporting a rack 12. The weight measurement can be used by the microcontroller 122 to calculate movement parameters for a loaded vehicle 16, such as appropriate acceleration and deceleration parameters in consideration of the weight of the rack 12 being transported by the vehicle 16. The movement parameters can also be calculated based on whether the contact plate 36 is in a raised or lowered position.

The weigher 138 can also be used to determine a weight distribution profile by using the known centre of gravity of an empty rack 12, the known weight of each goods item 42, and the positions of the goods items 42 on the rack 12. The weight distribution profile can be used to calculate the centre of gravity of the rack and loaded goods items 42, which is then used to ensure that the centre of gravity of the loaded rack 12 is within a defined range. In doing so, it is ensured that the loaded rack 12 does not bounce too much during transportation.

By one embodiment, the z component of the centre of gravity of a loaded rack 12 can be manipulated by adjusting the locations of the goods items 42 on the rack 12, in such a manner that the centre of gravity is not too high. It must be appreciated that the centre of gravity (COG) for the loaded rack can be computed based on a reference point on the rack and a distribution of goods items 42 on the rack 12 (i.e., the COG of each item). In addition, in relation to the x-y component of the centre of gravity, a cost value can be calculated for all goods item 42 receiving locations on the rack 12, each time a goods item 42 is added to or removed from a rack 12. The cost value may correspond to the amount by which the loaded rack 12 will deviate from the centre of gravity.

The microcontroller 122 may be configured to implement defined functionality in the vehicle 16, including control of the motors 126 in response to instructions from the planner 100, control of the lifting device 130 in response to instructions from the planner 100, management of communications with the sensors/camera 134 and the weigher 138, and management of communications to and from the network interface 120.

Figure 10:
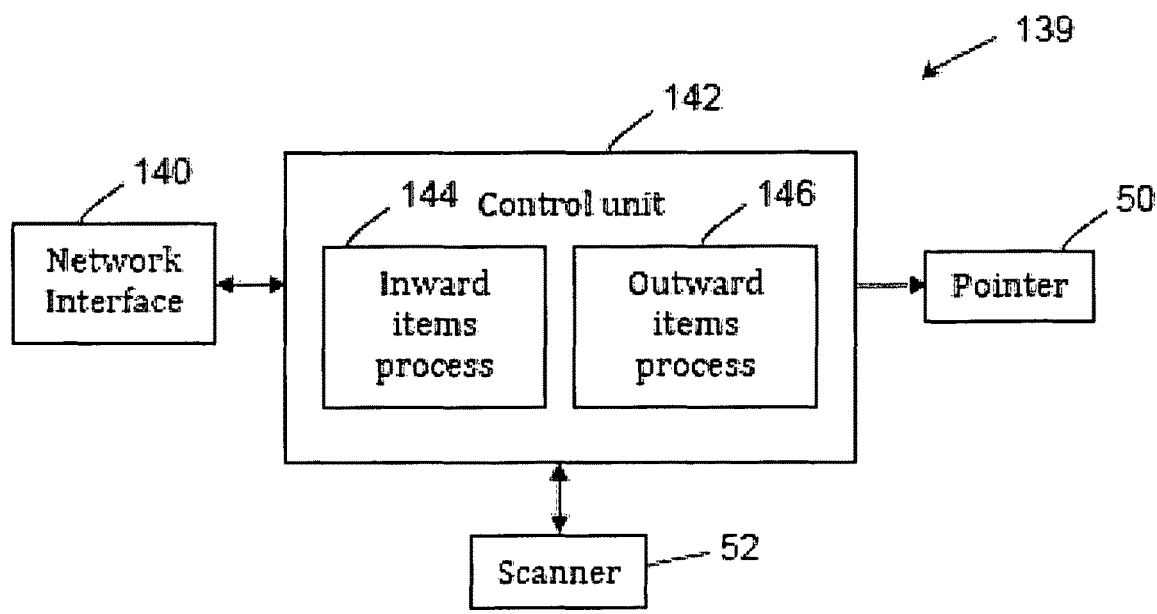
FIG. 10 is a block diagram illustrating functional components of an operator station of the goods handling system shown in FIG. 1.

Functional components 139 of an operator station 14 are illustrated in FIG. 10. The functional components 139 include a network interface 140 that facilitates networked communications between the operator station 14, the management system 18, and the vehicles 16. A control unit 142 controls and coordinate operations in the operator station 14. The control unit 142 is configured to implement defined functionality, such as an inward items process 144 and an outward items process 146.

The inward items process 144 manages reception of new items of inventory into the goods handling system 10, both in a physical sense and an electronic sense. In a physical sense, a new goods item 42 is disposed on a selected rack 12, and the rack 12 is transported to a storage location in the goods storage area 23. In an electronic sense, the presence and location of the goods item 42 is recorded in the inventory database 86.

The outward items process 146 manages retrieval of goods items 42 from the goods handling system 10, both in a physical sense and an electronic sense. In a physical sense, a goods item 42 forming part of an order is retrieved from a rack 12 in the goods storage area 23. In an electronic sense, a record of the retrieved item is removed from the inventory database 86.

The functional components 139 also include a pointing device 50 and a scanner 52. The pointing device 50 operates in conjunction with the inward items process 144 and the outward items process 146 to coordinate retrieval of the correct goods item(s) 42 from the rack(s) 12 and placement of the goods items 42 at the correct locations on the rack(s) 12. The scanner 52 is configured to scan identifiers on the goods items 42, such as the barcodes on the goods items 42, as they are picked from a rack 12 during order fulfilment or placed onto a rack 12 during addition of new inventory. The scanned barcodes enable the operator station 14 to check and verify whether the scanned goods item 42 is correct. In addition, or as an alternative to scanning the code, an object recognition device can be used to verify the scanned goods item 42 is correct.

Figure 11:
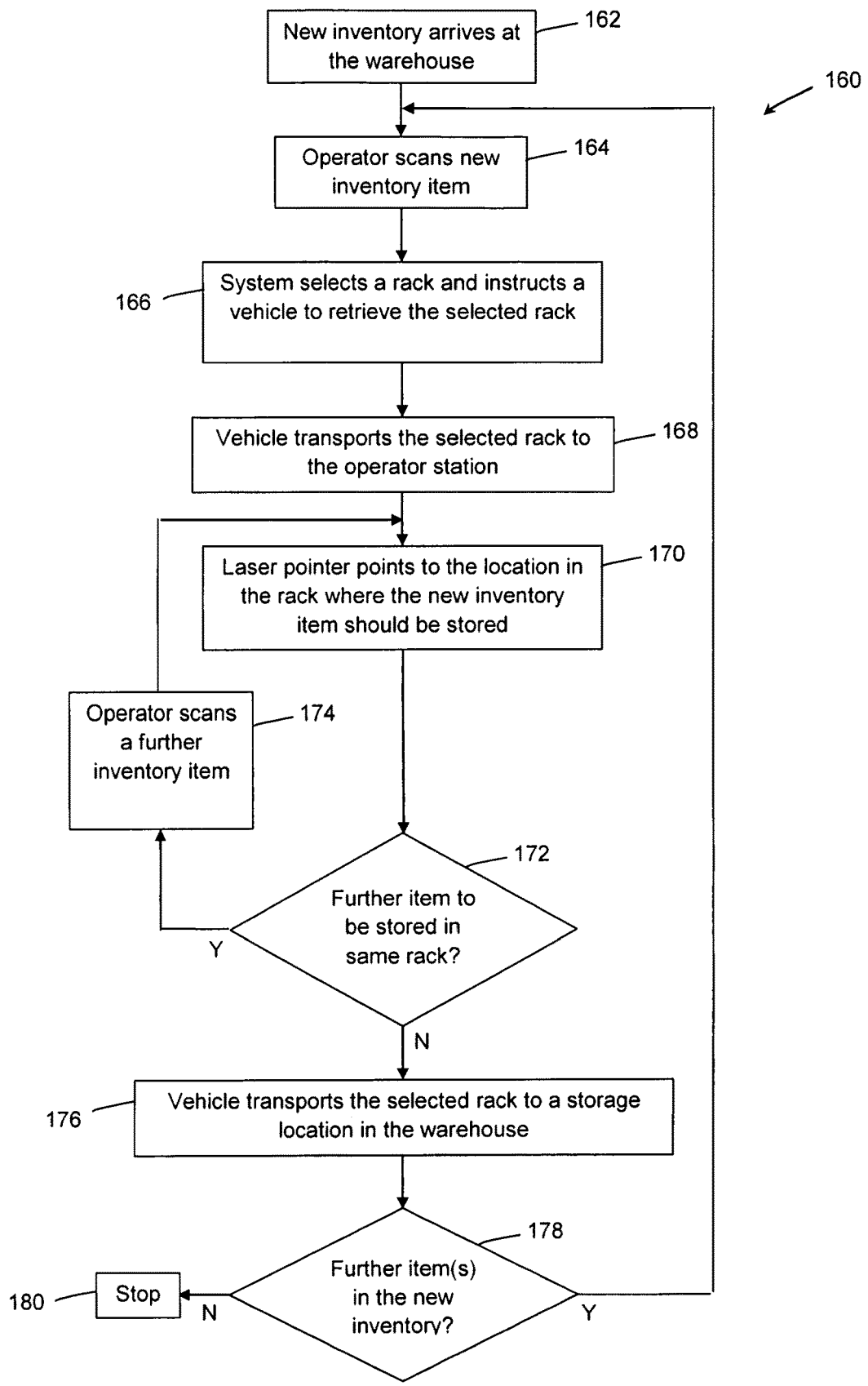
FIG. 11 is a flow diagram illustrating steps of an inventory process.

FIG. 11 depicts an exemplary flowchart 160 illustrating steps performed in an inventory process that is implemented by the goods handling system 10.

New inventory of goods items 42 arrives at the warehouse in step 162. For each goods item 42 received, an operator at an operator station 14 scans an identifier, such as a barcode on the goods item 42, using the scanner 52 in step 164. The operator station 14 communicates information indicative of the goods item 42 to the inventory manager 84 of the management system 18. The inventory manager 84 adds a record of the goods item 42 to the inventory database 86 and communicates the desired location of the goods item 42 in the goods storage area 23 to the operator station 14. For example, the rack 12 on which the goods item 42 should be stored and the location of placement of the goods item 42 on the rack 12 are communicated to the operator station 14. In an embodiment, instructions can be given by the inventory manager 84 to change the placement of one or more goods items 42 to optimize organization of the total goods items 42 on the rack 12.

Further, based upon the location communication received from the management system 18, the inward items process 144 instructs a vehicle 16 to retrieve the relevant rack 12 from the goods storage area 23 in step 166. After the rack 12 has been transported 168 to the operator station 14, the pointing device 50 indicates the location on the rack 12 where the goods item 42 should be placed in step 168. For example, a laser pointer can point at the location on the rack 12 in which the goods item 42 should be placed in step 170.

In step 172, it is determined whether another goods item 42 is to be stored on the same rack 12. If another goods item 42 is to be placed on the same rack 12, the additional goods item 42 is scanned and placed at a particular location on the rack 12 indicated to the operator by the pointing device 50 in step 174. If no additional goods items 42 are to be placed on the same rack 12, the rack 12 is transported back to a defined storage location in the goods storage area 23 in step 176. It is determined whether there is an additional goods item 42 in the new inventory in step 178. The process is repeated for each new inventory goods item 42 to be stored in the goods storage area 23 in step 178. When there are no additional goods items 42 in the new inventory, the process ends at step 180.

Figure 12:
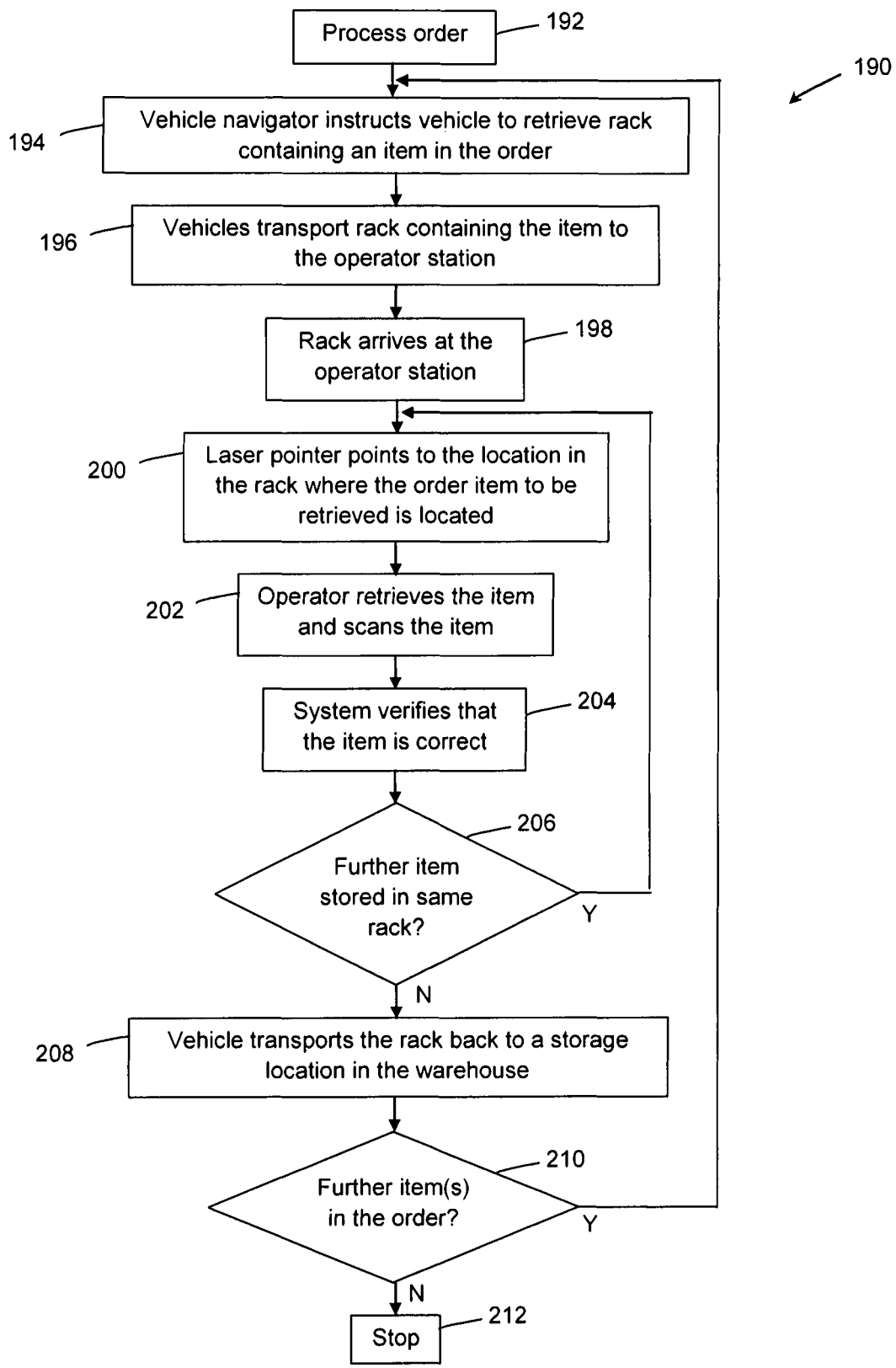
FIG. 12 is a flow diagram illustrating an item picking process.

FIG. 12 depicts a flow diagram 190 illustrating steps 192 to 212 of an item picking process implemented by the goods handling system 10. By one embodiment, an order-processing server adds incoming orders to an order queue. An order is triggered for processing by the order manager 90 of the management system 18 in step 192. The order-processing server determines the best set of racks (i.e., the racks having the smallest rack cost) to fulfil the order in the order queue. When the best set of racks has been determined, a task-assignment server calculates the best set of vehicles to carry the set of racks to the operator station 14 for an inventory retrieval process. A path-calculating server calculates the most efficient navigation paths for the selected vehicles in which there are no over-lapping regions within the navigation paths.

For a goods item 42 forming part of the order, the vehicle navigator 104 instructs a vehicle 16 to retrieve a selected rack 12 containing the goods item 42 in the order from the goods storage area 23 in step 194. Step 194 can be achieved by successively communicating navigation instructions to the vehicle 16 to indicate successive navigation paths to travel between markers 20*a*-20*d*. When the vehicle 16 reaches the selected rack 12, the selected rack 12 is identified using the navigation marker under the selected rack 12. The vehicle navigator 104 aligns the centroid of the vehicle with the centre of the selected rack 12 using data from the navigation marker to ensure the selected rack 12 is aligned during the rack lift and transport. The selected rack 12 is lifted from the ground by increasing the height of the lift head of the vehicle 16. As an example, the selected rack is lifted approximately 5-10 cm from the ground for transport.

The vehicle 16 transports the selected rack 12 containing the goods item 42 to the operator station 14 in step 196. The vehicles carry their selected racks 12 to the operator station 14 using previously-calculated acceleration and deceleration profiles for each associated vehicle 16. When the selected rack 12 arrives at the operator station 14 in step 198, control of each vehicle 16 is transferred to a queue management server. The queue management server moves the vehicles 16 in the order-processing queue. When the vehicle 16 has reached a pick point at the operator station 14, a pointing device 50 points to the location on the rack 12 where the goods item 42 is to be located in step 200. In an example, a laser pointer is directed at the location on the rack 12.

The operator at the operator station 14 retrieves the identified goods item 42 from the rack 12 and scans an identifier located on the goods item 42 in step 202. In response, the operator station 14 communicates information indicative of the goods item 42 to verify whether the correct goods item 42 has been selected in step 204. If the item is verified as correct, the information indicative of the goods item 42 is also communicated to the inventory manager 84 of the management system 18, which removes a record of the goods item 42 from the inventory database 86.

In step 206, it is determined whether another goods item 42 is stored on the same rack 12. If an additional goods item 42 is to be picked from the same rack 12, the pointing device 50 indicates the location on the rack 12 where the additional goods item 42 to be picked is located, and the above process is repeated for each additional goods item 42.

Additionally, by one embodiment, goods items 42 on a rack may not be in an optimum arrangement. For example, added inventory of goods items 42 may have originally been placed in an optimum location. However, with further added inventory, the rack space may not be utilized to its fullest potential, or a centre of gravity may have shifted off balance. Therefore, the inventory manager 84 may send instructions to reorganize some or all of the goods items 42 on the rack 12.

Further, if no further goods items 42 are to be picked from the same rack 12, the rack 12 is transported back to a defined storage location in the goods storage area 23 in step 208. In step 210, it is determined whether there are additional goods items 42 in the order in step 210. The process is repeated for each additional new goods item 42 in the order that is to be retrieved from the goods storage area 23. When there are no additional goods items 42 in the order, the process ends at step 212.

Figure 13A:
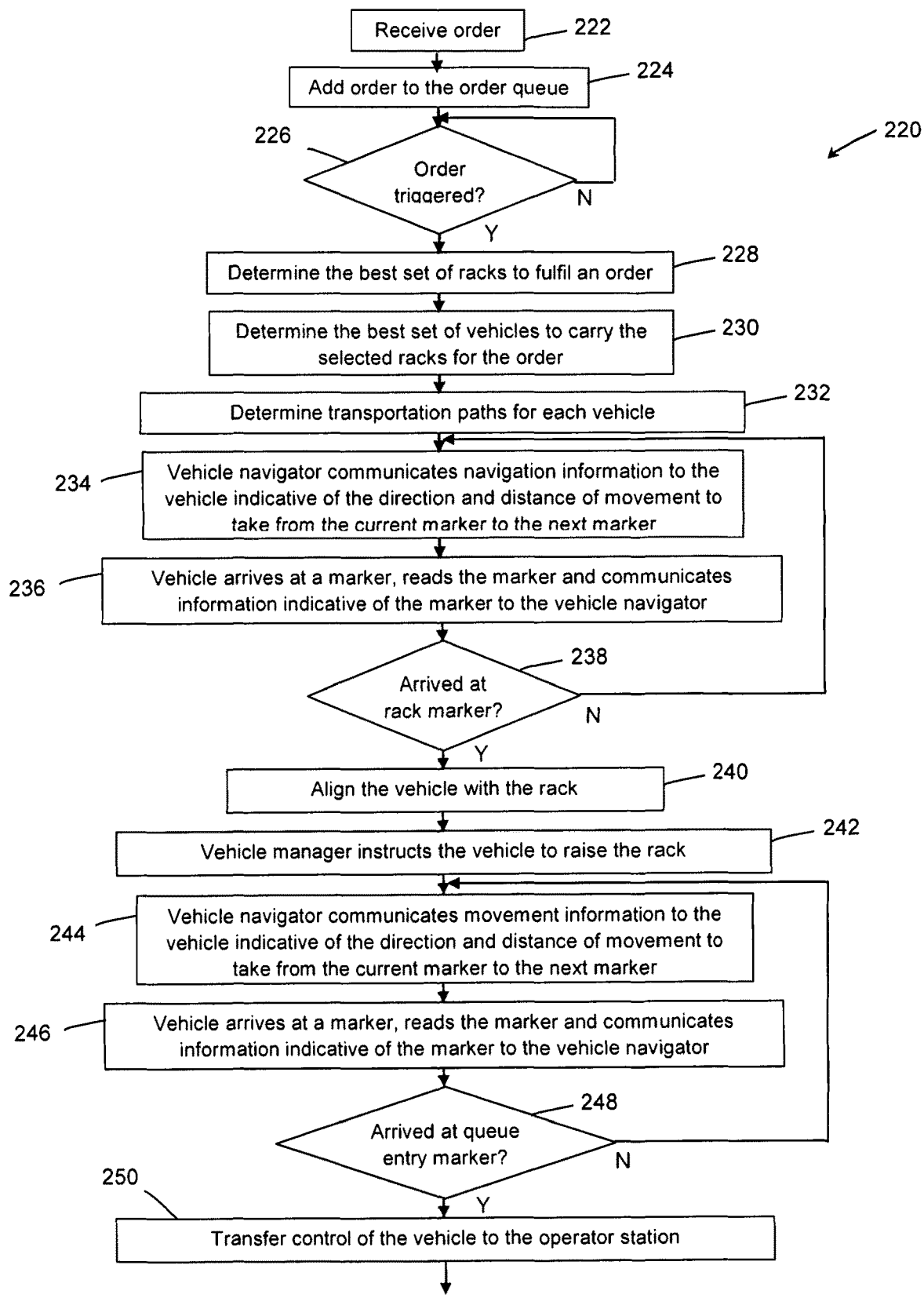
FIG. 13A and FIG. 13B depict a flow diagram illustrating an order fulfilment process.
Figure 13B:
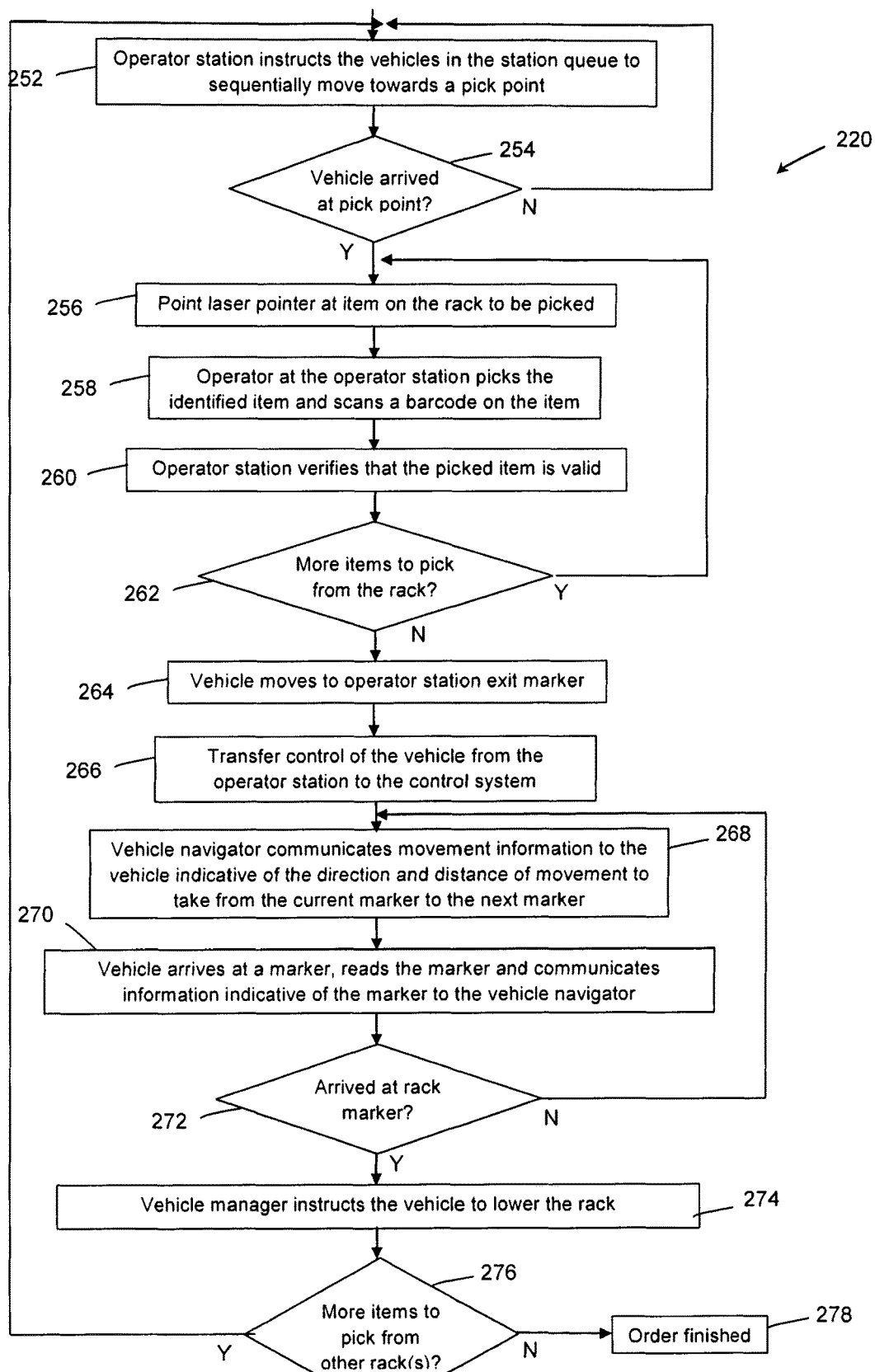

Turning now to FIGS. 13A and 13B is depicted a flowchart 220 illustrating the steps performed in an order fulfillment process and control of vehicle movement.

Orders are received at the management system 18 using an order generator 88, for example through an electronic commerce website in step 222. The received orders are recorded in the orders database 92 by the order manager 90 and placed in an order queue in step 224. In step 226, it is determined whether an order has been triggered. When an order is triggered for fulfillment, the task manager 96 determines the preferred rack combination for fulfillment of the order based on the heuristic calculation described above in step 228. The task manager 96 determines the best set of vehicles 16 to carry out retrieval of each of the determined racks 12 based on the locations of the vehicles 16 relative to the racks 12 in step 230.

For each rack 12 in the rack combination, the path calculator 102 at the management system 18 calculates the transportation path to be followed by each vehicle 16 during retrieval of the racks 12 in step 232. The transportation path of the vehicle 16 in going back to the goods storage area 23 is also determined. In an embodiment, the transportation paths are calculated using an A* algorithm. The transportation path defines the sequence of markers 20a-20d through which a vehicle 16 will pass in order to travel from its current location to the relevant rack 12 in the goods storage area 23, or the sequence of markers 20a-20d through which a vehicle 16 will pass in order to travel from the goods storage area 23 to the operator station 14.

For each vehicle 16 assigned to retrieve a rack 12 from the goods storage area 23, the vehicle navigator 104 communicates navigation instructions to the vehicle 16, which indicates a segmented navigation path to travel from the current marker 20a-20d to a subsequent marker 20a-20d in the defined transportation path in step 234. Such navigational information includes direction information, for example in the form of a bearing, and distance information indicative of the distance between the current marker 20a-20d and the subsequent marker 20a-20d. When the vehicle 16 arrives at the subsequent marker 20a-20d, the vehicle 16 reads the unique identification information associated with the subsequent marker 20a-20d using the sensors 134, and communicates the information indicative of the subsequent marker 20a-20d to the vehicle navigator 104 in step 236.

In step 238, it is determined whether the vehicle 16 has arrived at the marker 20b of the determined rack 12 to be retrieved. If the subsequent marker 20a-20d is not the determined rack marker 20b, the vehicle navigator 104 communicates further navigation instructions to the vehicle 16, which indicates to the vehicle 16 how to travel from the current marker 20a-20d to a further subsequent marker 20a-20d in the defined transportation path. This process continues until the subsequent marker 20a-20d of the determined rack marker 20b has been reached. In the event a marker 20a-20d is completely missed and a vehicle 16 is temporarily "lost," the vehicle 16 can be instructed to stop and/or positional sensors on the vehicle 16 can be retrieved.

When the vehicle 16 arrives at the rack marker 20b disposed underneath the rack 12 to be retrieved, the position determiner 132 determines the position of the vehicle 16 relative to the rack 12 and if necessary, the vehicle 16 moves relative to the rack 12 in order to properly align the vehicle 16 with the rack 12 in step 240. Sensors 134 on the vehicle 16 assist the position determiner 132 in properly aligning the vehicle 16 with the rack 12. After alignment, the vehicle manager 110 sends a communication to the vehicle 16 to instruct the vehicle 16 to raise the rack 12 from the ground by raising the contact plate 36 from the lowered position to the raised position in step 242.

The vehicle 16 moves towards the operator station 14 along a further defined transportation path. The vehicle navigator 104 communicates navigation instructions to the vehicle 16, which indicates to the vehicle 16 how to travel from the current rack marker 20b to a subsequent marker 20a-20d in the defined transportation path in step 244. Navigational information can include direction information, for example in the form of a bearing, and distance information indicative of the distance between the current marker 20a-20d and the subsequent marker 20a-20d. When the vehicle 16 arrives at the subsequent marker 20a-20d, the vehicle 16 reads the marker 20a-20d and communicates the information indicative of the marker 20a-20d to the vehicle navigator 104 in step 246. In step 248, it is determined whether the vehicle 16 has arrived at the queue entry marker 20c. If the vehicle 16 has not arrived at the queue entry marker 20c, the process continues until the subsequent marker 20a-20d is a queue entry marker 20c.

When the vehicle 16 arrives at a queue entry marker 20c, control over movement of the vehicle 16 is transferred from the management system 18 to the operator station 14 in step 250. The operator station 14 instructs the vehicles 16 and associated racks 12 in the station queue 22 to make sequential steps towards a pick point adjacent to an operator in step 252. In step 254, it is determined whether a vehicle 16 has arrived at the pick point. When a vehicle with a rack 12 arrives at the pick point, the pointing device 50 indicates the location on the rack where the goods item 42 to be picked is located in step 256. This can be implemented by directing a laser pointer at the location on the rack 12. The operator at the operator station 14 picks the goods item 42 and scan the goods item 42 in step 258. The operator station 14 verifies whether the goods item 42 that has been picked from the rack 12 is correct in step 260. If the goods item 42 is correct, the operator places the item in the assigned order bin 46.

In step 262, it is determined whether there are more goods items 42 to pick from the rack 12. If there are more items to pick, the process is repeated for each additional goods item 42 to be picked from the same rack 12. When no further goods items 42 are to be picked from the rack 12, the vehicle 16 and rack 12 are controlled by the operator station and are moved towards a queue exit marker 20d at an exit of the station queue 22 in step 264. When the vehicle detects the queue exit marker 20d, control over vehicle movement is transferred from the operator station 14 to the management system 18 in step 266.

The vehicle navigator 104 communicates movement information to the vehicle 16 to indicate the direction and distance of movement to take from the current marker 20a-20d to the next marker 20a-20d in step 268. When the vehicle 16 arrives ata marker 20a-20d, the vehicle 16 reads the marker 20a-20d and communicates information indicative of the marker 20a-20d to the vehicle navigator 104 in step 270.

At step 272, it is determined whether the vehicle 16 has arrived at a rack marker 20b. If the vehicle 16 has not arrived at a rack marker 20b, the process is repeated until a rack marker 20b has been reached. The vehicle 16 transports the rack 12 back to the relevant storage location in the goods storage area 23. At the storage location in the goods storage area 23, the vehicle manager 110 sends a communication to the vehicle 16 to instruct the vehicle 16 to lower the rack 12 to the ground by lowering the contact plate 36 in step 274.

In step 276, it is determined whether there are more goods items 42 to pick from other racks 12. If additional goods items 42 from other racks 12 are included in the order, the process is repeated for transportation of each other rack 12 from the goods storage area 23 to the operator station 14 and back to the goods storage area 23 until all goods items 42 in the order are disposed in the order bin 46. When all goods items 42 have been disposed in the order bin 46, the order is finished in step 278.

The process of FIGS. 13A-13B is illustrated for just one vehicle 16 for simplicity. However, in a working environment, several vehicles 16 can be operated simultaneously or in a successively-staggered operation by the vehicle navigator 104 to complete filling an order or completing an assignment.

Figure 14:
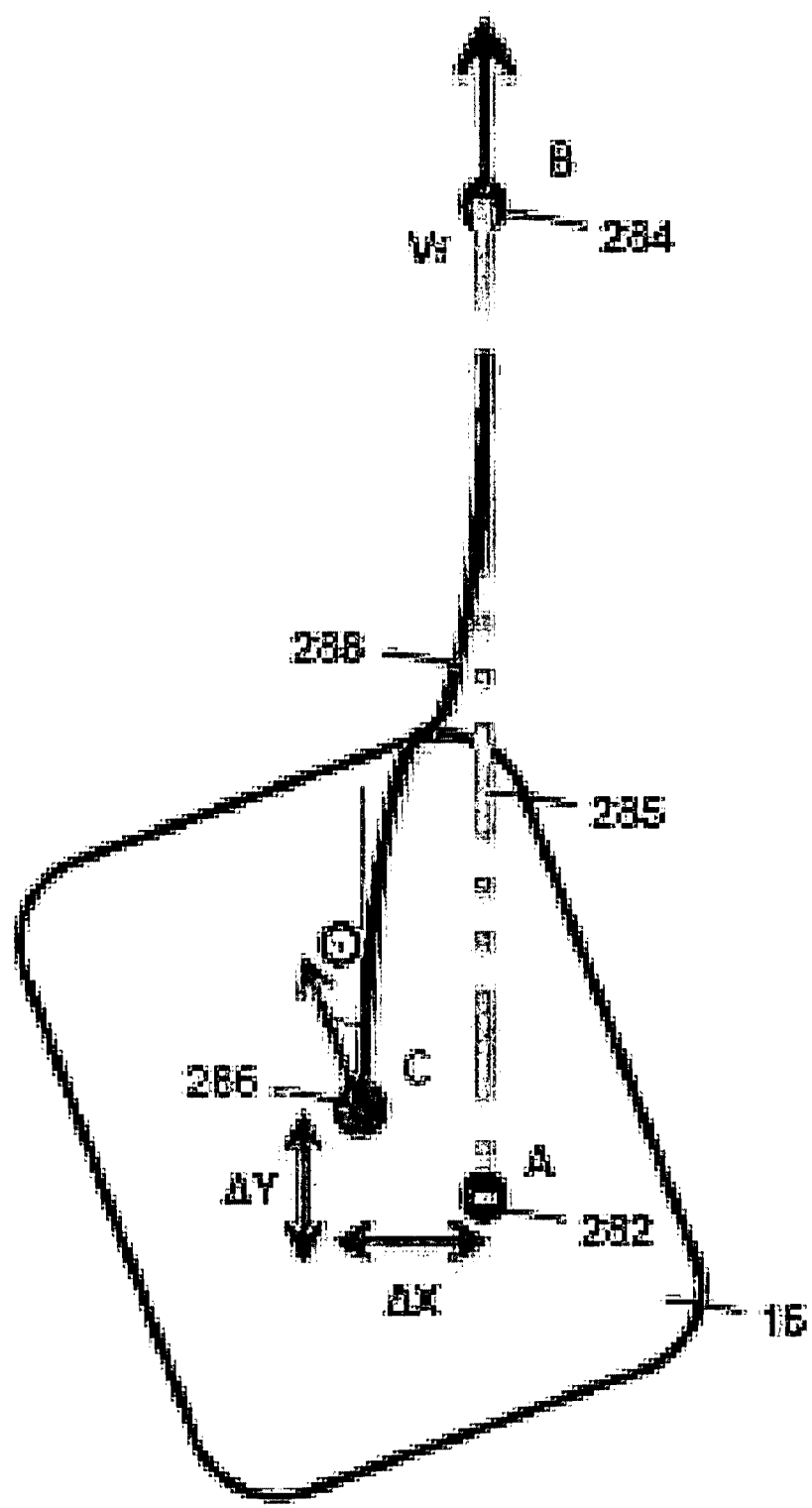
FIG. 14 is a diagram illustrating a methodology used for compensation of a navigation path of a vehicle.

FIG. 14 is a diagram illustrating a methodology used for compensation of a navigation path of a vehicle. FIG. 14 illustrates a vehicle 16 in an adjacent proximity to a first marker 282. The vehicle 16 is travelling towards a second subsequent marker 284. The navigation path 285 in the illustration is a straight line between the first marker 282 and the second marker 284.

As illustrated in FIG. 14, the centroid 286 of vehicle 16 is offset from the first marker 282 by a distance of $\sqrt{(\Delta X)^2+(\Delta Y)^2}$, wherein $\Delta X$ is the offset along a first axis (x-axis), and $\Delta Y$ is the offset along a second axis (y-axis). In order to compensate for the offset, a correction path 288 is defined that extends between the centroid 286 and the navigation path 285.

In an embodiment, the correction path 288 to apply to the uncorrected navigation path 285 is calculated using the offset distance $\Delta X$ of the centroid 286 from the first marker 282 along the x-axis and the offset distance $\Delta Y$ of the centroid 286 from the first marker 282 along the y-axis. Furthermore, the difference in the direction vectors (i.e., angular difference) of the transportation vehicle 16 and the uncorrected navigation path 285 (illustrated as Vf) is illustrated as an angle theta from the uncorrected navigation path 285. The angle theta is also used to calculate the correction path 288. By one embodiment, the correction path 288 is a Bezier curve that is generated based on the above stated information.

According to one embodiment, the correction path 288 may be calculated from a cumulative velocity profile. A cumulative velocity profile can consider certain variables, such as whether a vehicle 16 is carrying a rack 12 and if so, the weight of the rack 12. Note that if the vehicle 16 is carrying a rack 12, the correction path 288 needs to consider any other racks 12 within the navigation path as obstacles, as well as consider any other physical obstacles that may lie in the navigation path. If the vehicle 16 is not carrying a rack 12, only physical obstacles need to be considered.

By one embodiment, another variable considered in the computation of a compensation path is the number of marker segments that are to be traversed in a navigation path. As described below, from these variables, as well as other relevant variables, an acceleration distance and rate of acceleration, as well as a deceleration distance and a rate of deceleration can be computed. In an embodiment, a degree of acceleration per unit time, as well as a degree of deceleration per unit time can be obtained. For instance, a three-degree of acceleration and deceleration per unit time may be plotted. However, other degree amounts can be used to plot the acceleration and deceleration per unit time. Accordingly, the cumulative velocity profile can be obtained from the calculated acceleration profile, the deceleration profile, and a constant velocity profile. Application of the calculated cumulative velocity profile can result in a 3-degree Bezier curve. Thus, the Bezier curve can be the reference for movement of a projected centre of mass point of the vehicle on the ground to obtain the correction path 288. The above process is repeated as the vehicle 16 reaches a new marker 20a-20d on its navigation path.

By one embodiment, the navigation path between adjacent markers 282 and 284 is divided into a plurality of segments. In an example, the navigation path between two adjacent markers can be divided into five hundred segments. As movement of the vehicle 16 commences, a timer and a wheel counter are initiated. A wheel counter measures the amount of rotation about each wheel of a vehicle 16. The combined wheel rotations can identify the direction and distance traveled by the vehicle 16.

Furthermore, a segment counter maintains a record of the current segment. The respective velocities of the wheels 34 can be set at the start of each segment. After a predetermined time, such as every 500 µs, the timer is interrupted and the wheel count is read. If the wheel count is at least equal to an expected count, the segment counter is incremented. After a defined amount of the corrected navigation path has been completed, for example approximately 95% of the corrected navigation path, the vehicle 16 is instructed by the vehicle navigator 104 to attempt to detect the second marker 284.

By one embodiment, the calculations can be performed by considering the following parameters: let parameter NoM correspond to the number of steps (i.e., markers) to be traversed in a straight path (note that NoM is at least one), parameter X be a constant corresponding to acceleration distance (e.g., let X be assigned a value 120), parameter Y be a constant corresponding to deceleration distance (e.g., let Y be assigned a value 120), the parameter start_speed be assigned a value of 15, the parameter max_speed be assigned a value of 100, and the parameter stop_speed be assigned a value of 7.

An initial acceleration-deceleration profile is determined by computing an acceleration distance (AD), deceleration distance (DD), and maximum speed (MS) as follows:

$$AD = \text{minimum}(X, X*0.5*NoM) \quad (2)$$

$$DD = \text{minimum}(Y, Y*0.5*NoM) \quad (3)$$

$$MS = \text{minimum}(max\_speed, start\_speed*(4*NoM)) \quad (4)$$

Thus, by one embodiment, the acceleration-deceleration profile is computes based on the number of markers that are traversed in a straight line.

Further, in order to generate a compensation curve, the distance between the two markers (e.g., distance between the markers 282 and 284) is divided into a predetermined number of segments. Additionally, a predetermined number of interpolation points are selected. By one embodiment, four interpolation points are selected. Note that the number of points selected affects the smoothness of the compensation curve. It must be appreciated that embodiments described herein are in no manner limited to the selection of four interpolation points and any other number of interpolation points may be selected.

By one embodiment, the first interpolation point is assigned the coordinates of the offset position of the center of gravity of the vehicle, and the fourth coordinate point is assigned the coordinate of the second marker. Additionally, the coordinates for the intermediate interpolation points can be computed based on the initial offsets $\Delta X$ and $\Delta Y$, the initial angular difference (theta), and the distance between the markers. Upon computing the coordinates of interpolation points, a compensation curve such as Bezier curve can be generated. Further, upon the vehicle traversing each segment, the acceleration-deceleration profile can be modified based on wheel counter. Further, while adjusting the speed of the vehicle at each segment, by one embodiment, both linear and turning speeds of the vehicles are taken into account, as well as the determination of whether the vehicle is carrying a rack and the associated weight profile of the rack are taken into account.

By one embodiment of the present disclosure, the offset distances ΔX, ΔY of the centroid 286 from the first marker 282 are calculated by the vehicle navigator 104. The offset distances ΔX, ΔY are based on an image captured by the sensor/camera 134 in the vehicle 16, wherein the captured image includes the first marker 282. The location and orientation of the sensor/camera 134 relative to the vehicle 16 can be determined using a jig, for example. A permanent offset is calculated that represents the default distance between the centre of the vehicle 16 and the centre of the image captured by the sensor/camera 134.

The location and orientation of the first marker 282 in the captured image may be determined using image processing techniques. The centroid of the first marker 282 is calculated, and the offset between the first marker 282 and the centre of the vehicle 16 is determined. In this example, the location and orientation of the first marker 282 is determined using OpenCV image processing algorithms, although it will be understood that any suitable image processing techniques can be used.

Further, the coordinates of the corners of the first marker 282 and the coordinates of the centre of the first marker 282 can be determined using OpenCV function 'minAreaRect'. The corner coordinates are used to determine the angle of rotation of the vehicle 16 with respect to the first marker 282. The distance between the centre of the first marker 282 and the centre of the captured image represents the offset distances ΔX, ΔY.

By one embodiment, the offset distance can be determined using suitable sensors, such as a plurality of lasers that are used to measure distance, wherein the position of the centroid of the vehicle 16 relative to the marker 20 is calculated using triangulation techniques. However, other relative position determining arrangements can be used. Furthermore, the vehicle navigator 104 can also be arranged to calculate speed and acceleration information for movement of the vehicle 16, based on the transportation path to be followed by the vehicle 16 and based on the offset position of the vehicle 16 from the detected marker 20a-20d. The calculated speed, acceleration, and direction information are communicated to the motor driver 124 during movement of the vehicle 16.

Figure 15:
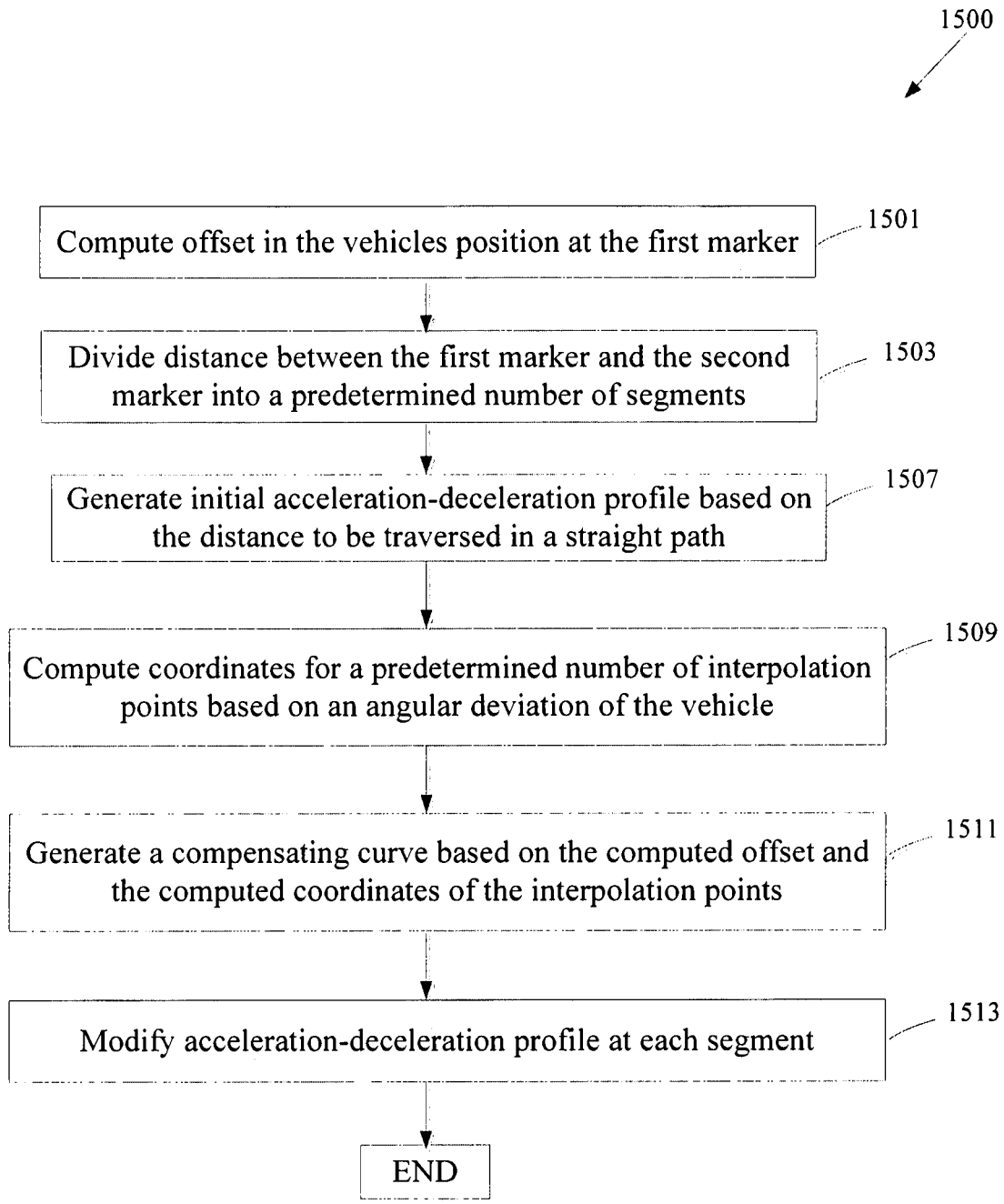
FIG. 15 depicts an exemplary flowchart depicting the steps performed in path correction according to an embodiment.

FIG. 15 depicts an exemplary flowchart 1500 depicting the steps performed in path correction according to an embodiment. The path correction steps as depicted in FIG. 15 are illustrated for the case of a vehicle traversing from a first marker to a second marker, and wherein the vehicle has an offset at the first marker.

In step 1501, the offset between the centroid of the vehicle and the first marker is computed. As stated previously, by one embodiment, the offset (ΔX, ΔY) may be computed based on an image captured by a sensor/camera that is disposed in the vehicle 16, wherein the captured image includes the first marker.

In step 1503, the distance between the first marker and the second marker is divided into a predetermined number of segments. By one embodiment, the distance between the markers is divided into 500 segments.

Further, in step 1507, an initial acceleration-deceleration profile based on the distance to be traversed in a straight path is computed. In the present example, the distance corresponds to the distance between the first marker and the second marker. Note however, that the distance may correspond to the number of markers that are to be traversed in a straight path. The acceleration-deceleration profile can be computed as stated previously in equations (2)-(4).

In step 1509, a predetermined number of interpolation points are selected. Further, as stated previously, coordinates for each of the interpolation points are computed based on an angular deviation of the vehicle and the distance between the first and second markers. The process in 1511 generates a compensation curve based on the computed offset in 1501 and the computed coordinates of the interpolation points in 1509.

Further, the process 1500 in step 1513 modifies the acceleration-deceleration profile of the vehicle after the vehicle has traversed a segment interval. For instance, by one embodiment, upon the vehicle traversing a segment, the speed of the vehicle is adjusted based on a wheel counter that measures the amount of rotation about each wheel of the vehicle. The combined wheel rotations correspond to the direction and distance traveled by the vehicle. In this manner, the process 1500 generates a compensation path for a vehicle that is offset at the first marker, thereby ensuring that the vehicle is positioned above the second marker when the vehicle commences traversing the distance between the markers. Nonetheless, it must be appreciated that in case the vehicle is not positioned exactly over the second marker, the process of 1500 can be repeated in order to provide further path correction.

Each of the functions of the described embodiments may be implemented by one or more processing circuits. A processing circuit includes a programmed processor (for example, processor 1603 in FIG. 16), as a processor includes circuitry. A processing circuit also includes devices such as an application-specific integrated circuit (ASIC) and circuit components that are arranged to perform the recited functions.

Figure 16:
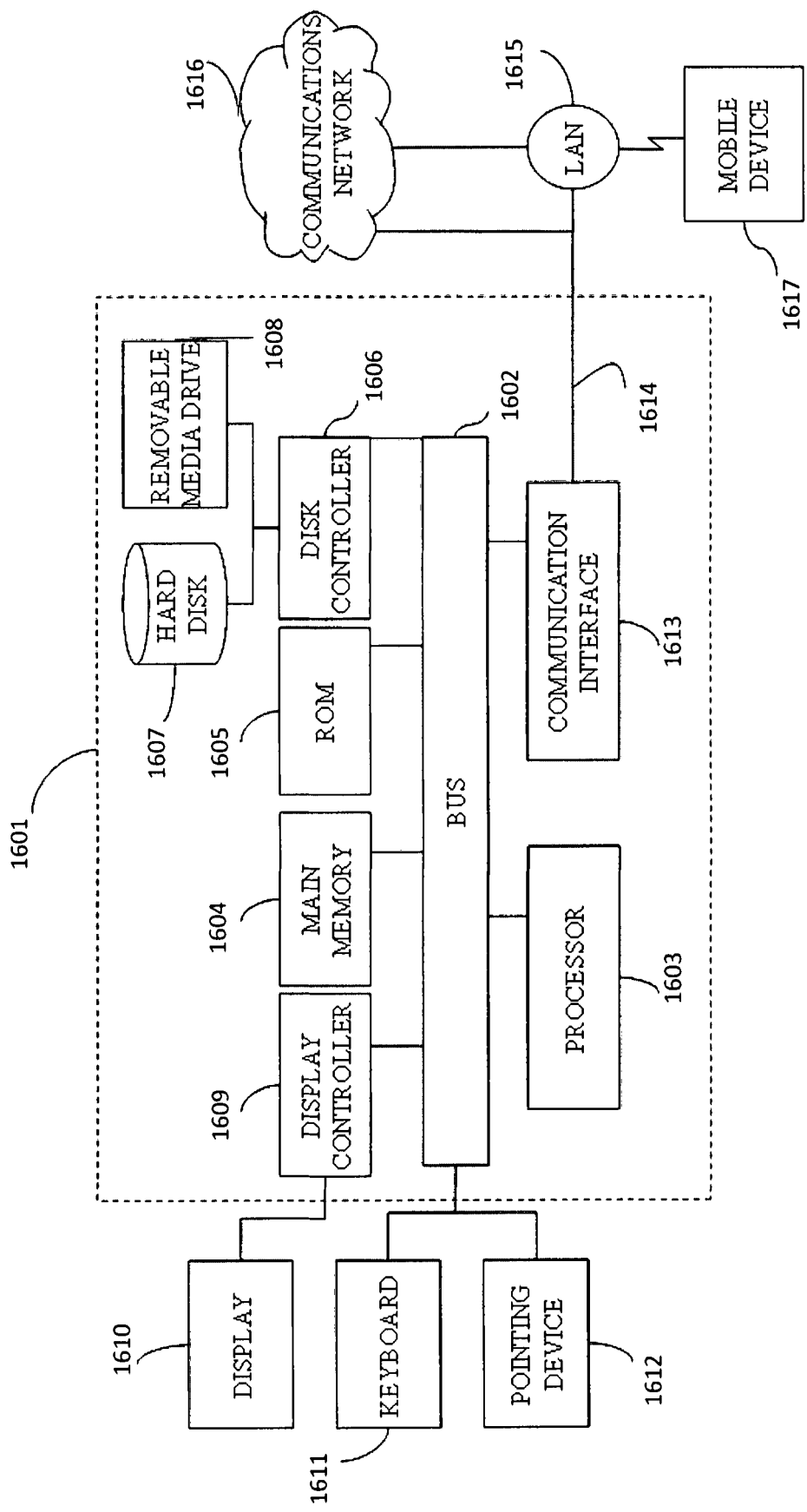
FIG. 16 illustrates a block diagram of a computing device according to one embodiment.

The various features discussed above may be implemented by a computer system (or programmable logic). FIG. 16 illustrates such a computer system 1601. In one embodiment, the computer system 1601 is a particular, special-purpose machine when the processor 1603 is programmed to perform navigational processes of the vehicle, computing compensation path, and other functions described above.

The computer system 1601 includes a disk controller 1606 coupled to the bus 902 to control one or more storage devices for storing information and instructions, such as a magnetic hard disk 1607, and a removable media drive 1608 (e.g., floppy disk drive, read-only compact disc drive, read/write compact disc drive, compact disc jukebox, tape drive, and removable magneto-optical drive). The storage devices may be added to the computer system 1601 using an appropriate device interface (e.g., small computer system interface (SCSI), integrated device electronics (IDE), enhanced-IDE (E-IDE), direct memory access (DMA), or ultra-DMA).

The computer system 1601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1601 may also include a display controller 1609 coupled to the bus 902 to control a display 1610, for displaying information to a computer user. The computer system includes input devices, such as a keyboard 1611 and a pointing device 1612, for interacting with a computer user and providing information to the processor 1603. The pointing device 1612, for example, may be a mouse, a trackball, a finger for a touch screen sensor, or a pointing stick for communicating direction information and command selections to the processor 1603 and for controlling cursor movement on the display 1610.

The processor 1603 executes one or more sequences of one or more instructions contained in a memory, such as the main memory 1604. Such instructions may be read into the main memory 1604 from another computer readable medium, such as a hard disk 1607 or a removable media drive 1608. One or more processors in a multi-processing arrangement may also be employed to execute the sequences of instructions contained in main memory 1604. In alternative embodiments, hard-wired circuitry may be used in place of or in combination with software instructions. Thus, embodiments are not limited to any specific combination of hardware circuitry and software.

As stated above, the computer system 1601 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1601, for driving a device or devices for implementing the features of the present disclosure, and for enabling the computer system 1601 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1603 for execution. A computer readable medium may take many forms, including but not limited to, non-volatile media or volatile media. Non-volatile media includes, for example, optical, magnetic disks, and magneto-optical disks, such as the hard disk 1607 or the removable media drive 1608. Volatile media includes dynamic memory, such as the main memory 1604. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 1603 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1601 may receive the data on the telephone line and place the data on the bus 902. The bus 902 carries the data to the main memory 1604, from which the processor 1603 retrieves and executes the instructions. The instructions received by the main memory 1604 may optionally be stored on storage device 1607 or 1608 either before or after execution by processor 1603.

The computer system 1601 also includes a communication interface 1613 coupled to the bus 902. The communication interface 1613 provides a two-way data communication coupling to a network link 1614 that is connected to, for example, a local area network (LAN) 1615, or to another communications network 1616 such as the Internet. For example, the communication interface 1613 may be a network interface card to attach to any packet switched LAN. As another example, the communication interface 1613 may be an integrated services digital network (ISDN) card. Wireless links may also be implemented. In any such implementation, the communication interface 1613 sends and receives electrical, electromagnetic or optical signals that carry digital data streams representing various types of information.

The network link 1614 typically provides data communication through one or more networks to other data devices. For example, the network link 1614 may provide a connection to another computer through a local network 1615 (e.g., a LAN) or through equipment operated by a service provider, which provides communication services through a communications network 1616. The local network 1614 and the communications network 1616 use, for example, electrical, electromagnetic, or optical signals that carry digital data streams, and the associated physical layer (e.g., CAT 5 cable, coaxial cable, optical fiber, etc.). The signals through the various networks and the signals on the network link 1614 and through the communication interface 1613, which carry the digital data to and from the computer system 1601 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1601 can transmit and receive data, including program code, through the network(s) 1615 and 1616, the network link 1614 and the communication interface 1613. Moreover, the network link 1614 may provide a connection through a LAN 1615 to a mobile device 1617 such as a personal digital assistant (PDA) laptop computer, or cellular telephone.

It must be appreciated that embodiments are described herein for a vehicle, such as a transportation vehicle or a transportation robot. However, embodiments described herein can be applied to other automatically guided vehicles. Examples include, but are not limited to a four-wheel drive vehicle, or a vehicle using an Ackerman steering system in which the front inside wheel turns into a curve at a greater radius than the front outside wheel.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

Furthermore, the foregoing discussion discloses and describes merely exemplary embodiments of the present invention. As will be understood by those skilled in the art, the present disclosure may be embodied in other specific forms without departing from the spirit or essential characteristics thereof. Accordingly, the present disclosure is intended to be illustrative and not limiting of the scope, as well as the claims. The disclosure, including any readily discernible variants of the teachings herein, defines in part, the scope of the foregoing claim terminology such that no subject matter is dedicated to the public. Additionally, the above disclosure also encompasses the embodiments listed below:

(1) A goods handling system comprising: a plurality of markers, each marker having associated unique identification information; at least one vehicle, each vehicle including at least one sensor arranged to detect a marker and obtain the unique identification information associated with the marker, and each vehicle arranged to controllably transport items between defined locations; and a data storage device including information indicative of each marker and navigational information associated with each marker, the navigational information indicative of the location of at least one defined other marker relative to the marker, and the navigational information usable to control movement of a vehicle between the marker and the at least one defined other marker; wherein the system is arranged to define a transportation path between defined locations, the transportation path defined by a plurality of selected markers, and the system arranged to control movement of a vehicle between the defined locations by using the navigational information associated with each marker.

(2) The goods handling system of (1), wherein each marker comprises a machine readable pattern.

(3) The goods handling system of (2), wherein the machine readable pattern includes a barcode or QR code.

(4) The goods handling system of (1), wherein each marker comprises a RFID device.

(5) The goods handling system of (1)-(4) comprising at least one operator station, wherein the system is arranged to controllably move each vehicle to and from an operator station.

(6) The goods handling system of (5), wherein the operator station includes a station queue, and wherein each vehicle arriving at the operator station enters the station queue, one or more items being placed on the rack or removed from the rack when the vehicle is in the station queue.

(7) The goods handling system of (6), wherein the markers include at least one queue entry marker disposed adjacent an entry location of the station queue, and at least one queue exit marker disposed adjacent an exit location of the station queue.

(8) The goods handling system of (5)-(7), wherein the system includes a plurality of item racks and each vehicle is arranged to controllably transport a rack to and from an operator station.

(9) The goods handling system of (8), wherein the markers include rack markers, each rack marker disposed adjacent or under a rack when the rack is disposed at a rack storage location.

(10) The goods handling system of (8), wherein the markers include rack markers disposed on respective racks.

(11) The goods handling system of (1)-(10), wherein the markers include warehouse markers disposed between a rack storage location and the at least one operator station.

(12) The goods handling system of (1)-(11), wherein each vehicle includes a contact member and a lifting device arranged to controllably raise or lower the contact member relative to the ground.

(13) The goods handling system of (1)-(12), comprising a management system in wireless communication with the vehicles, the management system arranged to provide the instructions to control movement of a vehicle between the defined locations by using the navigational information associated with each marker.

(14) The goods handling system of (5), wherein the system is arranged to transfer control of movement of a vehicle to the operator station when the vehicle is in the station queue.

(15) The goods handling system of (1)-(14), wherein the navigational information defines a navigation path between markers in a transportation path, the system arranged to determine an offset displacement between the vehicle and an adjacent marker, and the system arranged to use the determined offset displacement to calculate a compensation path, the compensation path modifying the navigation path to produce a compensated navigation path used to control movement of the vehicle between the markers.

(16) The goods handling system of (15), wherein the compensation path is a Bezier curve.

(17) The goods handling system of (15)-(16), wherein the navigation path is divided into a plurality of path segments, and the system is arranged such that instructions to control movement of the vehicle are provided at the start of each path segment.

(18) The goods handling system of (15) to (17), wherein the system is arranged to determine an offset displacement between the vehicle and an adjacent marker by capturing an image that includes the adjacent marker and processing the image to determine the distance between a centroid of the adjacent marker and a centroid of the captured image.

(19) The goods handling system of (18), wherein the image is processed so as to determine the coordinates of the corners of the adjacent marker, the corner coordinates being used to determine the angle of rotation of the adjacent marker.

(20) The goods handling system of (1)-(19), wherein the velocity of a vehicle is dependent on whether the vehicle is loaded.

(21) The goods handling system of (20), wherein each vehicle includes a weighing device arranged to weigh an item transported by the vehicle, the velocity of the vehicle being dependent on the weight.

(22) The goods handling system of (1)-(21), wherein the system is arranged to determine a weight distribution profile by using the known centre of gravity of an empty rack, the known weight of each transported item and the positions of the transported items on the rack.

(23) The goods handling system of (22), wherein the weight distribution profile is used to calculate the centre of gravity of the rack and loaded items, and to determine whether the centre of gravity of the loaded rack is within a defined range.

(24) The goods handling system (1)-(23), wherein the navigational information comprises a displacement value and a bearing value.

(25) The goods handling system of (1)-(24), wherein the system is arranged to store information indicative of the locations of all vehicles relative to the markers.

(26) The goods handling system of (1)-(25), wherein the system is arranged to store inventory information indicative of all items associated with the goods handling system including the respective racks on which the items are located and the locations on the racks where the items are located.

(27) The goods handling system of (1) to (26), comprising an order manager arranged to manage timing of order processing.

(28) The goods handling system of (27), wherein the order manager is arranged prioritise order processing based on the expected time taken to fulfil the order.

(29) The goods handling system of (27) or (28), wherein the order manager is arranged to determine a combination of racks to use to fulfil an order using the following heuristic: Heuristic, H=Distance/(1+No of Common Racks), where Distance is the combined distance of all racks in a rack combination from an available order bin, and No of Common Racks is the number of racks in the rack combination that are common to more than one rack set.

(30) The goods handling system of (1)-(29), wherein the system comprises a task manager arranged to determine a set of vehicles to use to fulfil an order.

(31) The goods handling system of (1)-(30), comprising a path calculator arranged to calculate a transportation path for each vehicle in the selected set of vehicles.

(32) The goods handling system of (31), wherein the transportation path is calculated using an A* algorithm.

(33) The goods handling system of (1)-(32), comprising a vehicle navigator arranged to manage movement of each vehicle individually.

(34) The goods handling system of (33), wherein the vehicle navigator is arranged to receive the unique identification information associated with a detected marker from a vehicle, and in response to communicate the navigational information associated with the detected marker to the vehicle.

(35) The goods handling system (1)-(34), wherein the system is arranged to manage movements of the vehicles so as to avoid collisions between the vehicles.

(36) The goods handling system of (35), wherein the system is arranged to reserve markers and/or navigation paths, manage the timing or movements and/or speed of the vehicles, and/or control vehicles so as to move temporarily outside the transportation path.

(37) A method of handling goods, the method comprising: disposing a plurality of markers in a defined area, each marker having associated unique identification information; providing at least one vehicle, each vehicle including at least one sensor arranged to detect a marker and obtain the unique identification information associated with the marker, and each vehicle arranged to controllably transport items between defined locations; and storing information indicative of each marker and navigational information associated with each marker, the navigational information indicative of the location of at least one defined other marker relative to the marker, and the navigational information usable to control movement of a vehicle between the marker and the at least one defined other marker; defining a transportation path between defined locations, the transportation path defined by a plurality of selected markers; and controlling movement of a vehicle between the defined locations by using the navigational information associated with each marker.

(38) The method of (37), wherein each marker comprises a machine readable pattern.

(39) The method of (38), wherein the machine readable pattern includes a barcode or QR code.

(40) The method of (38), wherein each marker comprises a RFID device.

(41) The method of (37)-(40), comprising providing a management system in wireless communication with the vehicles, and providing instructions from the management system to control movement of a vehicle between the defined locations using the navigational information associated with each marker.

(42) The method of (37)-(41), comprising providing at least one operator station having a station queue, controlling each vehicle to move to and from an operator station, and transferring control of movement of a vehicle to the operator station when the vehicle is in the station queue.

(43) The method of (37)-(42), wherein the navigational information defines a navigation path between markers in a transportation path, the method comprising determining an offset displacement between the vehicle and an adjacent marker, using the determined offset displacement to calculate a compensation path, and using the compensation path to modify the navigation path to produce a compensated navigation path used to control movement of the vehicle between the markers.

(44) The method of (43), wherein the compensation path is a Bezier curve.

(45) The method (43) or (44) comprising dividing the navigation path into a plurality of path segments, and providing instructions to control movement of the vehicle at the start of each path segment.

(46) The method as (43)-(45), comprising determining an offset displacement between the vehicle and an adjacent marker by capturing an image that includes the adjacent marker and processing the image to determine the distance between a centroid of the adjacent marker and a centroid of the captured image.

(47) The method of (46), comprising processing the image so as to determine the coordinates of the corners of the adjacent marker, and using the corner coordinates to determine the angle of rotation of the adjacent marker.

(48) The method of (37)-(47), comprising determining a weight distribution profile by using the known centre of gravity of an empty rack, the known weight of each transported item and the positions of the transported items on the rack.

(49) The method of (48), comprising using the weight distribution profile to calculate the centre of gravity of the rack and loaded items, determining whether the centre of gravity of the loaded rack is within a defined range.

(50) The method of (37)-(49), comprising storing information indicative of the locations of all vehicles relative to the markers.

(51) The method of (37)-(50), comprising prioritising order processing based on the expected time taken to fulfil the order.

(52) The method of (37)-(51), comprising determining a combination of racks to use to fulfil an order using the following heuristic: Heuristic, H=Distance/(1+No of Common Racks), where Distance is the combined distance of all racks in a rack combination from an available order bin, and No of Common Racks is the number of racks in the rack combination that are common to more than one rack set.

(53) The method of (52), comprising calculating the transportation path using an A* algorithm.

(54) The method as claimed of (37)-(53), comprising managing movements of the vehicles so as to avoid collisions between the vehicles by reserving markers and/or navigation paths, managing the timing or movements and/or speed of the vehicles, and/or controlling vehicles so as to move temporarily outside the transportation path.

(55) A navigation system for navigating a vehicle, the system comprising: at least one sensor arranged to detect a marker adjacent the sensor; the system arranged to use navigational information indicative of the location of at least one defined other marker relative to the detected marker to control movement of the vehicle along a navigation path between the detected marker and the other marker; and the system arranged to determine an offset displacement between the vehicle and the detected marker, and to use the determined offset displacement to calculate a compensation path, the compensation path modifying the navigation path to produce a compensated navigation path used to control movement of the vehicle between the markers; wherein the compensation path comprises a Bezier curve.

(56) The navigation system of (55), wherein the navigation path is divided into a plurality of path segments and the system is arranged such that instructions to control movement of the vehicle are provided at the start of each path segment.

(57) The navigation system of (55) or (56), wherein the system is arranged to determine an offset displacement between the vehicle and an adjacent marker by capturing an image that includes the adjacent marker and processing the image to determine the distance between a centroid of the adjacent marker and a centroid of the captured image.

(58) The navigation system of (57), wherein the image is processed so as to determine the coordinates of the corners of the adjacent marker, the corner coordinates being used to determine the angle of rotation of the adjacent marker.

The invention claimed is:

1. An information processing apparatus for controlling movement of a plurality of vehicles along transportation paths, the information processing apparatus comprising:
   a communication interface configured to communicate with the plurality of vehicles; and
   circuitry configured to:
   (i) receive, from one of the plurality of vehicles via the communication interface, first marker information that is generated based on a first marker being detected by the one of the plurality of vehicles, the first marker being one of a plurality of markers located at predetermined positions,
   (ii) determine a second marker of the plurality of markers to which the one of the plurality of vehicles is to be moved from the first marker,
   (iii) generate first control information to control movement of the one of the plurality of vehicles from the first marker to the second marker based on the first marker information and predetermined navigation information associated with the first marker, the predetermined navigation information indicating the location of the second marker relative to the first marker, and
   (iv) transmit, via the communication interface, the first control information to the one of the plurality of vehicles,
   wherein a transportation path between the first marker and the second marker is divided into a plurality of path segments,
   wherein upon the one of the plurality of vehicles reaching an end of a path segment of the plurality of path segments, the circuitry is further configured to receive, from the one of the plurality of vehicles, vehicle position feedback information recorded by the one of the plurality of vehicles as the one of the plurality of vehicles travels between segments of the plurality of segments, the vehicle position feedback information corresponding to a wheel counter of the one of the plurality of vehicles that keeps track of a number of rotations of the wheels of the one of the plurality of vehicles as the one of the plurality of vehicles travels between segments of the plurality of segments, and
   wherein, based on the received vehicle position feedback information, the circuitry is further configured to (i) calculate control information to control the movement of the one of the plurality of vehicles at a start of a next path segment of the plurality of path segments and (ii) transmit the calculated control information to the one of the plurality of vehicles at a start of the next path segment of the plurality of path segments.

2. The information processing apparatus of claim 1, wherein the circuitry is further configured to:
   receive, from the one of the plurality of vehicles via the communication interface, second marker information that is generated based on the second marker being detected by the one of the plurality of vehicles;
   determine a third marker of the plurality of markers to which the one of the plurality of vehicles is to be moved from the second marker; and
   generate second control information to control movement of the one of the plurality of vehicles from the second marker to the third marker based on the second marker information and the predetermined navigation information, the predetermined navigation information indicating the location of the third marker relative to the second marker.

3. The information processing apparatus of claim 1, wherein
   the second marker neighbors the first marker, and
   the predetermined navigation information indicates the relative location of each marker of the plurality of markers that neighbors the first marker.

4. The information processing apparatus of claim 1, wherein the first marker information includes a unique identifier extracted by the one of the plurality of vehicles from a machine readable pattern.

5. The information processing apparatus of claim 1, wherein the first marker information includes orientation information of the one of the plurality of vehicles with respect to the first marker and identification information associated with the first marker.

6. The information processing apparatus of claim 1, wherein the first marker information includes an image of the first marker that is captured by the one of the plurality of vehicles.

7. The information processing apparatus of claim 1, wherein the circuitry is further configured to:
compute one of the transportation paths, the one of the transportation paths including a sequence of markers of the plurality of markers to be traversed by the one of the plurality of vehicles starting at a source marker and terminating at a destination marker.

8. The information processing apparatus of claim 1, wherein the circuitry is further configured to:
retrieve the predetermined navigation information from a marker map stored in a memory, the marker map including, for each of the plurality of markers, navigation information indicative of the location of at least one defined other marker of the plurality of markers relative to the respective one of the plurality of markers, the navigation information being usable to control movement of the one of the plurality of vehicles between the respective one of the plurality of markers and the at least one defined other marker.

9. The information processing apparatus of claim 8, wherein the navigation information includes a displacement value corresponding to a distance between the respective one of the plurality of markers and the at least one defined other marker of the plurality of markers, and a bearing angle value.

10. The information processing apparatus of claim 8, wherein the marker map includes a plurality of keys, each key of the plurality of keys corresponding to one of the plurality of markers and including:
a first data field that stores identification information when a vehicle is disposed on the corresponding marker,
a second data field that stores reservation information of the corresponding marker,
a third data field that stores information corresponding to neighboring markers of the corresponding marker, the neighboring markers including at least one of a marker that is deployed in a north direction, a south direction, an east direction, and a west direction from the marker,
a fourth data field that stores a distance of the corresponding marker to each of the neighboring markers, the distance being used to determine a cost incurred by the vehicle in travelling from the corresponding marker to the corresponding neighboring marker, and
a fifth data field that indicates whether the vehicle can deploy a goods rack at the marker.

11. A vehicle comprising:
circuitry configured to:
(i) detect a first marker of a plurality of markers located at predetermined positions,
(ii) generate first marker information based on the detected first marker,
(iii) transmit the generated first marker information to an information processing apparatus that is configured to control movement of a plurality of vehicles,
(iv) receive first control information from the information processing apparatus, the first control information being generated by the information processing apparatus based on the first marker information and predetermined navigation information in response to the first marker information, and
(v) cause the vehicle to move to a second marker of the plurality of markers based on the first control information, wherein the predetermined navigation information indicates the location of the second marker relative to the first marker,
wherein a transportation path between the first marker and the second marker is divided into a plurality of path segments,
wherein upon the vehicle reaching an end of a path segment of the plurality of path segments, the circuitry is further configured to transmit, to the information processing apparatus, vehicle position feedback information recorded by the vehicle as the vehicle travels between segments of the plurality of segments, the vehicle position feedback information corresponding to a wheel counter of the vehicle that keeps track of a number of rotations of the wheels of the vehicle as the vehicle travels between segments of the plurality of segments, and
wherein, based on the transmitted vehicle position feedback information, the circuitry is further configured to receive, from the information processing apparatus at a start of a next path segment of the plurality of path segments, control information calculated from the transmitted vehicle position feedback information to control the movement of the vehicle.

12. The vehicle according to claim 11, wherein the circuitry is further configured to:
detect the second marker;
generate second marker information based on the detected second marker;
transmit the generated second marker information to the information processing apparatus;
receive second control information from the information processing apparatus, the second control information being generated by the information processing apparatus based on the second marker information and the predetermined navigation information in response to the first marker information; and
cause the vehicle to move to a third marker of the plurality of markers, wherein the predetermined navigation information indicates the location of the third marker relative to the second marker.

13. The vehicle according to claim 11, wherein
the second marker neighbors the first marker, and
the predetermined navigation information indicates the relative location of each marker of the plurality of markers that neighbors the first marker.

14. The vehicle according to claim 11, wherein
the first marker is a machine readable pattern, and
the circuitry is further configured to extract a unique identifier from the machine readable pattern.

15. The vehicle according to claim 11, wherein the first marker information includes orientation information of the vehicle with respect to the first marker and identification information associated with the first marker.

16. The vehicle according to claim 11, wherein the first marker information includes an image of the first marker that is captured by the vehicle.

17. A system, comprising:
an information processing apparatus for controlling movement of a plurality of vehicles, the information processing apparatus including
a communication interface configured to communicate with the plurality of vehicles; and
first circuitry configured to:
(i) receive, from a vehicle of the plurality of vehicles via the communication interface, first marker information that is generated based on a first marker being detected by the one of the plurality of vehicles, the first marker being one of a plurality of markers located at predetermined positions,
(ii) determine a second marker of the plurality of markers to which the vehicle of the plurality of vehicles is to be moved from the first marker,
(iii) generate first control information to control movement of the vehicle of the plurality of vehicles from the first marker to the second marker based on the first marker information and predetermined navigation information associated with the first marker, the predetermined navigation information indicating the location of the second marker relative to the first marker, and
(iv) transmit, via the communication interface, the first control information to the vehicle of the plurality of vehicles; and the vehicle including second circuitry that is configured to:
(i) detect the first marker of the plurality of markers located at the predetermined positions,
(ii) generate the first marker information based on the detected first marker,
(iii) transmit the generated first marker information to the information processing apparatus,
(iv) receive the first control information from the information processing apparatus, and
(v) cause the vehicle to move to the second marker of the plurality of markers based on the first control information, wherein the predetermined navigation information indicates the location of the second marker relative to the first marker, wherein a transportation path between the first marker and the second marker is divided into a plurality of path segments, wherein upon the vehicle reaching an end of a path segment of the plurality of path segments, the first circuitry is further configured to receive, from the second circuitry, vehicle position feedback information recorded by the vehicle as the vehicle travels between segments of the plurality of segments, the vehicle position feedback information corresponding to a wheel counter of the vehicle that keeps track of a number of rotations of the wheels of the vehicle as the vehicle travels between segments of the plurality of segments, and wherein, based on the received vehicle position feedback information, the first circuitry is further configured to (i) calculate control information to control the movement of the vehicle at a start of a next path segment of the plurality of path segments and (ii) transmit the calculated control information to the vehicle at a start of the next path segment of the plurality of path segments.

18. The information processing apparatus of claim 1, wherein the circuitry is further configured to reserve the second marker of the plurality of markers such that another vehicle cannot enter a reserved region including the second marker of the plurality of markers.

\* \* \* \* \*